(12) United States Patent
Pasquier et al.

(10) Patent No.: US 9,248,602 B2
(45) Date of Patent: Feb. 2, 2016

(54) METHOD FOR CHANGING A MOLD

(75) Inventors: Hervé Pasquier, Octeville sur Mer (FR);
Damien Cirette, Octeville sur Mer (FR);
Nicolas Chomel, Octeville sur Mer (FR);
Yves-Alban Duclos, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 939 days.

(21) Appl. No.: 13/393,338

(22) PCT Filed: Sep. 6, 2010

(86) PCT No.: PCT/EP2010/063052
§ 371 (c)(1),
(2), (4) Date: Feb. 29, 2012

(87) PCT Pub. No.: WO2011/026981
PCT Pub. Date: Mar. 10, 2011

(65) Prior Publication Data
US 2012/0161349 A1    Jun. 28, 2012

(30) Foreign Application Priority Data

Sep. 7, 2009 (FR) .................................... 09 56082
Sep. 7, 2009 (FR) .................................... 09 56084

(51) Int. Cl.
*B29C 49/58* (2006.01)
*B29C 49/48* (2006.01)
*B29C 33/26* (2006.01)
(Continued)

(52) U.S. Cl.
CPC ................. *B29C 49/48* (2013.01); *B29C 33/26* (2013.01); *B29C 49/06* (2013.01); *B29C 2049/4856* (2013.01); *B29C 2049/4858* (2013.01); *B29C 2049/4864* (2013.01); *B29C 2049/4889* (2013.01); *B29L 2031/7158* (2013.01)

(58) Field of Classification Search
USPC .............................................. 264/39
See application file for complete search history.

(56) References Cited

U.S. PATENT DOCUMENTS 5,302,105 A    4/1994  Bertleff
5,439,368 A    8/1995  Martin
(Continued)

FOREIGN PATENT DOCUMENTS

AT          9 438 U1      10/2007
CN       201 165 049      12/2008
(Continued)

OTHER PUBLICATIONS

International Search Report dated Oct. 28, 2010, corresponding to PCT/EP2010/063052.
(Continued)

*Primary Examiner* — Jacob Thomas Minskey
(74) *Attorney, Agent, or Firm* — Young & Thompson

(57) ABSTRACT

A method for changing a mould of a moulding device, includes at least the following steps for dismounting a mould: (a) controlling fixing elements in order to release each mould half (20), (b) joining the mould halves together in order to form a single transportable sub-set, (c) opening mould carriers (14) from their closed position during steps (a) and (b) in order to extract, with a translational movement, the sub-set arranged in a reference position, and (d) removing the sub-set as a single unit from its reference position, from between the mould carriers.

22 Claims, 11 Drawing Sheets

(51) Int. Cl.
  *B29C 49/06*    (2006.01)
  *B29L 31/00*    (2006.01)

(56) References Cited

U.S. PATENT DOCUMENTS

| | | | |
|---|---|---|---|
| 5,552,098 A | | 9/1996 | Kudo et al. |
| 5,968,560 A | * | 10/1999 | Briere et al. .............. 425/192 R |
| 6,464,486 B1 | | 10/2002 | Barray et al. |
| 7,384,261 B2 | | 6/2008 | Mie et al. |
| 2004/0202745 A1 | | 10/2004 | Tsau et al. |

FOREIGN PATENT DOCUMENTS

| | | |
|---|---|---|
| DE | 36 13 543 | 12/1986 |
| EP | 0 513 951 | 11/1992 |
| EP | 0 893 221 | 1/1999 |
| EP | 0 821 641 | 8/2000 |
| FR | 2 646 802 | 11/1990 |
| FR | 2 764 544 | 12/1998 |
| FR | 2 863 930 | 6/2005 |
| JP | 9 066531 | 3/1997 |
| JP | 10 180813 | 7/1998 |
| JP | 2005 246634 | 9/2005 |
| WO | 2004/018181 | 3/2004 |

OTHER PUBLICATIONS

French Search Report dated May 20, 2010, corresponding to Foreign Priority Application No. 0956084.

* cited by examiner

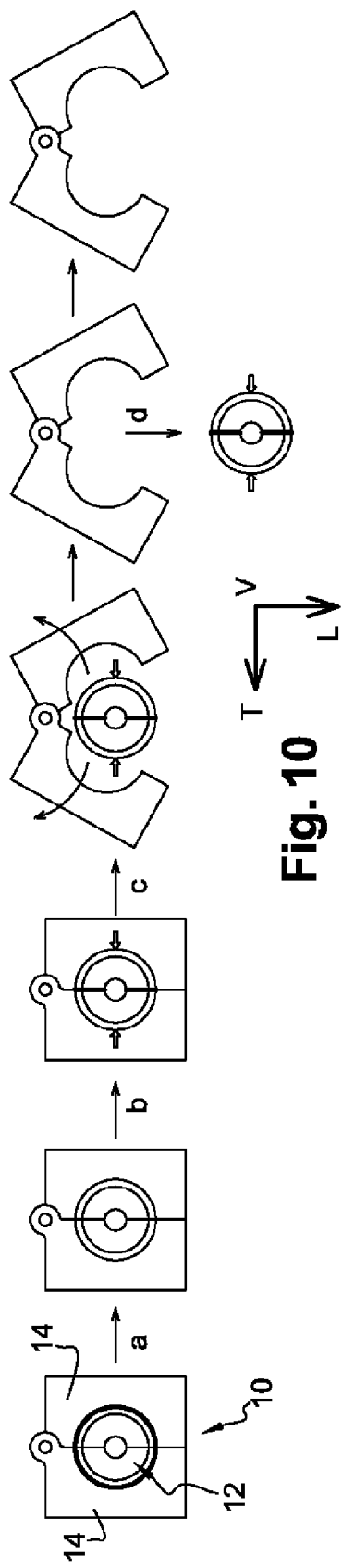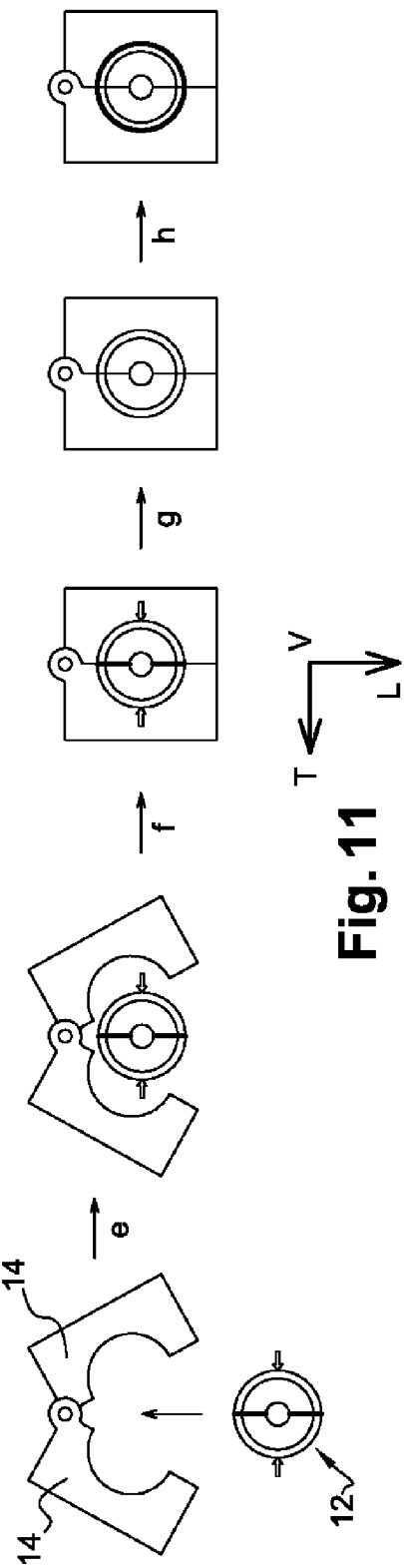
Fig. 10
Fig. 11

METHOD FOR CHANGING A MOLD

The present invention concerns a method of changing a mold for the manufacture of containers and fixing devices for implementing such a method.

The present invention concerns more particularly a method of changing a mold of a molding device for the manufacture of thermoplastic material containers, notably bottles, by forming a pre-heated preform, said molding device including two mold-carriers mounted to be mobile relative to each other about a rotation axis between an open position and a closed position and two half-molds each fixed in demountable manner to an associated mold-carrier by fixing means.

Such molding devices intended to equip machines for manufacturing containers, notably but not exclusively so-called "rotary" machines including a carousel provided circumferentially with a particular number of identical blowing stations, are known in the art.

Plastic material containers such as bottles, flasks, etc. are manufactured therein from preforms or blanks pre-heated in a heat treatment oven.

In the manufacturing phase, depending on the number of mold imprints, one or more preforms are thus fed to a station of the machine to be introduced into a molding device associated with forming means that employ at least one pressurized gas and/or liquid fluid.

The preform is formed (or shaped) for example by blowing or by drawing-blowing by means of a pressurized gas, such as air, or even at least in part by means of a pressurized liquid.

In a "rotary" manufacturing machine, each so-called "book-like opening" molding device includes at least one mold constituted of two half-molds supported by respective mold-carriers that are mounted to be mobile relative to each other about a generally vertical rotation axis.

Each half-mold is received in a complementary recess of the associated mold-carrier to which the half-mold is removably fixed by fixing means in order to enable demounting with a view to changing the mold.

A change of mold is in particular required to manufacture containers of different shapes and/or sizes or to replace them in the event of damage to and/or wear of the half-molds.

To reduce production costs as much as to reduce the time necessary for such demounting of the mold various improvements to such "book-like opening" molding devices have already been proposed in the document EP-B1-0 821 641.

Firstly, means for regulating the temperature of the imprints of each half-mold are produced in a part separate from the half-mold so that each half-mold comprises (using the terminology of the above document) on the one hand a shell-carrier provided with temperature regulating means and adapted to be supported by the mold-carrier and on the other hand a shell provided with a half-imprint of the container to be produced that is adapted to be removably fastened to the shell-carrier by means of fixing means of a fixing device.

Then, the means for fixing the shell to the shell-carrier are disposed on respective edges of the shell and the half-shell parallel to the main axis of the imprint.

These fixing means include in particular means for screwing a clamping bar to a joint face of the shell-carrier. The clamping bar includes clamping lugs projecting from the joint face of the half-mold for fixing the shell firmly to the shell-carrier.

With such fixing means, the mounting and demounting steps for changing the molds of a molding device equipping a station of a rotary manufacturing machine, also known as a "blow-molding machine", are executed by at least one operator and the shell is fitted with a circular movement.

To be more precise, the shell is introduced into the corresponding recess of the shell-carrier, the edge of the mold situated on the same side as the articulation means between the mold-carriers is first moved into position and then, continuing the circular movement, the other edge is moved into position to proceed to fixing by means of the fixing means, which are actuated at this point.

Thus the mounting and demounting operations require the use of tools, such as screwdrivers, to operate the fixing means with the operator facing the mold-carriers in the open position.

One shell and then the other shell are successively demounted and the new shells are mounted one after the other.

It is readily apparent that such a mounting and/or demounting operation is delicate and that "book-like opening" type molding devices have specific features appropriate in particular to address access problems faced by the operator who has to use these tools and to maneuver precisely each shell (or half-mold).

Moreover, despite the improvements made to the fixing means, the aim is to reduce further the total time necessary for changing a mold including mounting and demounting the half-molds.

The immobilization of the machine during these operations represents a high cost because of the accompanying complete cessation of production, the mold changing operations occurring more or less frequently depending on the users.

This is one of the reasons for which ongoing the aim is to reduce further the times necessary to carry out the steps of mounting/demounting the half-molds during a change of mold.

To this end, the invention proposes a method of changing a mold of a molding device for the manufacture of containers of the type described above.

According to the invention, the method includes, for demounting a mold, at least the steps of:

(a) actuating the fixing means to release each half-mold when the mold-carriers occupy the closed position, (b) joining the half-molds together by means of assembly means in such a manner as to form a transportable unitary subassembly when the mold-carriers occupy the closed position, (c) opening the mold-carriers from the closed position to the open position to remove said unitary subassembly therefrom by a movement in translation and in such a manner that said unitary subassembly remains in a reference position, and (d) removing the unitary subassembly from between the mold-carriers from its reference position.

According to other features, the method includes, for the execution of the step (a), at least:

a substep (a1) consisting in commanding the unlocking of at least one actuator member of the fixing means occupying a fixing position to release said actuator member;

a substep (a2) consisting in actuating a drive system to slide an actuator member of the fixing means from a fixing position to a release position;

a substep (a3) consisting in actuating the locking of at least one actuator member of the fixing means occupying a release position to retain said actuator member in the release position;

a substep (a4) executed after the release of each half-mold and consisting in actuating unsticking means to cause the unsticking of each half-mold from the mold-carrier.

The method advantageously includes at least the following steps for mounting another mold:
(e) placing a unitary subassembly in said reference position between the mold-carriers in the open position,
(f) closing the mold-carriers onto the unitary subassembly,
(g) removing the assembly means from the unitary subassembly to allow the separation of the half-molds,
(h) actuating the fixing means to fix each half-mold to the associated mold-carrier.

The method advantageously includes a supplementary step executed before the step (c) and after the step (e) consisting in actuating support means adapted to retain said unitary subassembly in the reference position.

According to other features, the method includes, for the execution of the step (h), at least:
 a substep (h1) consisting in actuating the unlocking of at least one actuator member of the fixing means occupying the release position to release said actuator member, notably adapted then to be returned automatically toward the fixing position;
 the method includes, for the execution of the step (h), at least a substep (h2) consisting in actuating a drive system to drive sliding of an actuator member of the fixing means from a fixing position to a release position;
 the method includes, for the execution of the step (h), at least a substep (h3) consisting in actuating the locking of at least one actuator member of the fixing means occupying a fixing position to retain said actuator member in the fixing position.

The invention further concerns fixing devices for the execution of the method, each fixing device including means for fixing each half-mold to the mold-carrier that are adapted to be actuated selectively to fix or to release each half-mold when the mold-carriers are in the closed position.

Each fixing device is advantageously adapted to allow introduction or removal of the unitary subassembly by a movement in translation.

Thanks to the method of the invention of changing a mold and the fixing device, the time required to change a mold is greatly reduced compared to that necessary previously with the fixing devices of the prior art.

According to other features of the fixing device of the invention:
 the device includes fixing means including at least one member for actuating the fixing means that is adapted to be driven in movement between at least a fixing position and a release position from outside the molding device when the mold-carriers are in the closed position;
 the actuator member of the fixing means is driven in translation in such a manner as to slide between said fixing and release positions;
 the actuator member of the fixing means is driven in rotation between said fixing and release positions;
 the selectively operated fixing means are adapted to exert a force of attraction on each half-mold to fix it to the associated mold-carrier;
 the fixing means exerting said force of attraction are suction means adapted to fix the half-molds by a sucker effect.

Thanks to the various fixing devices of the invention it is possible to operate the fixing means from the exterior of the molding device so as selectively to fix the half-molds to the mold-carrier or to release them therefrom regardless of the open or closed position occupied by the mold-carriers.

By comparison with the prior art fixing means in which the mold-carriers must necessarily be in the open position to allow access to the fixing means, the fixing means of the invention are adapted to be actuated independently of the open or closed position of said mold-carriers.

The fixing means of the invention advantageously enable fixing or release of each half-mold without precise manipulation of tools, the fixing means being actuated rapidly and simply when the mold-carriers occupy the closed position.

According to the invention, when both edges of each shell are equipped with fixing means in accordance with the teachings of the invention, it is possible to carry out in a single operation the mounting or demounting of a unitary subassembly including the two half-shells enclosing the mold bottom.

In accordance with the mold changing method of the invention, the subassembly can then be removed in a single operation as soon as the mold-carriers are opened thanks to the fixing means of the invention that allow removal as well as introduction of each shell by a movement in translation.

Other features and advantages of the present invention will become apparent on reading the following detailed description to assist understanding of which reference should be made to the drawings, in which:

FIG. 1 is a perspective view that shows the molding device in place on a station of a container manufacturing machine and that shows mold-carriers including half-molds in their closed position;

FIG. 2 is a perspective view that shows the main parts of the molding device from FIG. 1, which includes fixing means of a first embodiment of the invention, and that shows the mold-carriers in the open position, half-molds each constituted of a shell-carrier mounted in a recess of a mold-carrier and a shell, the two shells completed by a mold bottom forming a unitary subassembly that can be removed from between or introduced between the mold-carriers with a view to demounting it or mounting it;

Figure 7:
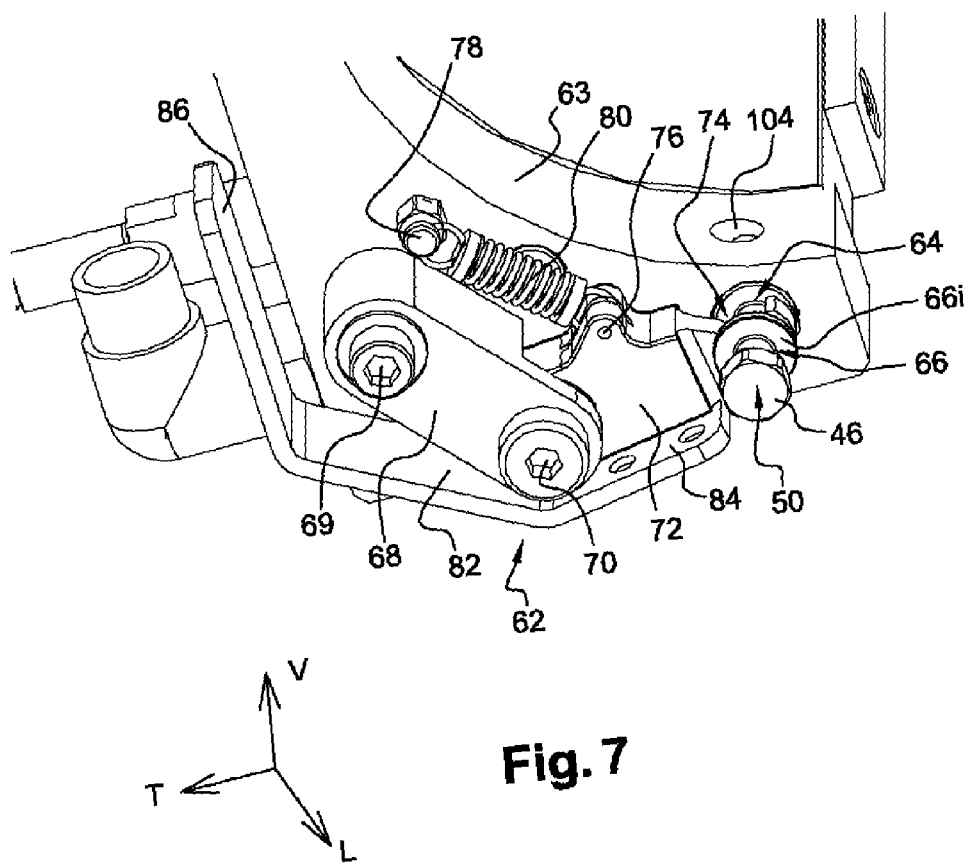
Figure 8:
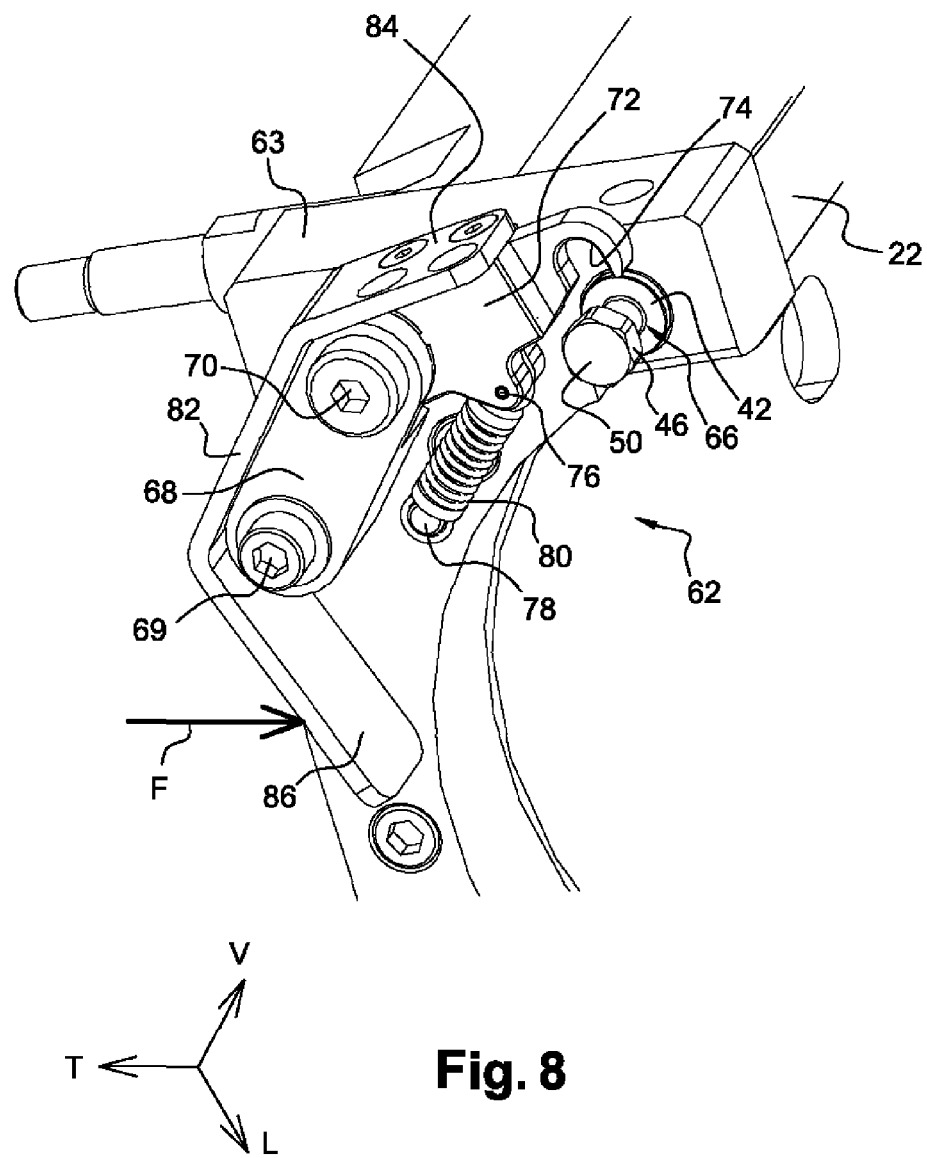
Figure 9:
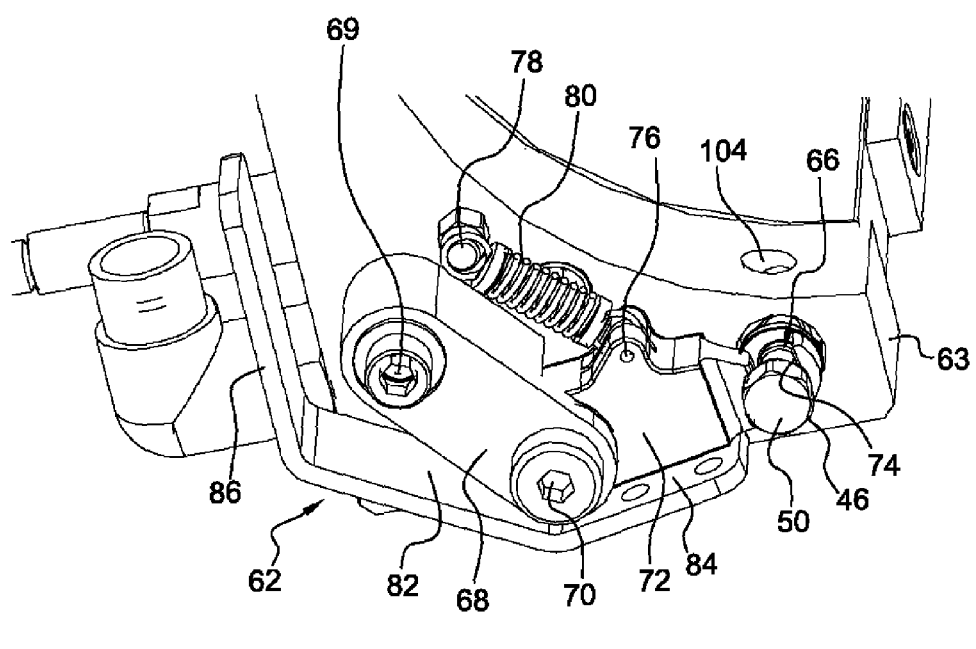
Figure 9:
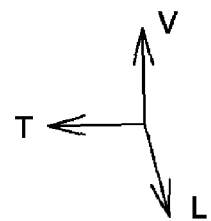

FIGS. 7 to 9 are perspective views that show the molding device, as seen from below, showing one embodiment of a locking system that may be associated with the actuator member of the fixing means, FIGS. 7, 8 and 9 successively showing said system in the locked position of the member occupying the release position, in the unlocked position, and in the locked position of the member occupying the fixing position;

FIGS. 10 and 11 are top views diagrammatically showing a molding device and respectively showing the demounting phase and the mounting phase executed in accordance with the method of the invention of changing a mold.

The remainder of the description adopts, without this limiting the invention, longitudinal, vertical and transverse orientations referred to the orthogonal frame of reference (L, V, T) shown in the figures, the longitudinal and transverse directions being defined in fixed manner relative to the mold-carriers so that the open or closed position occupied does not impact on said orientations.

By convention, there will be used, without this being limiting on the invention, the terms "front" and "rear" with reference to the longitudinal orientation, "upper" and "lower" with reference to the vertical orientation, and finally "left" or "right" and "interior" or "exterior" with reference to the transverse orientation more particularly oriented from the exterior of the mold toward the interior of the mold.

In the remainder of the present description, without this being limiting on the invention, there are used interchangeably the terms "shell" or "half-mold" to designate the first part including the half-imprint and, correspondingly, "shell-carrier" or "mold-carrier" to designate the second part receiving the first part, the shell-carrier remaining fastened to the mold-carrier during a change of mold being equivalent to a one-piece assembly.

A first embodiment of the fixing means of the invention shown in FIGS. 1 to 6 is described next, as well as an embodiment of a locking system shown in FIGS. 7 to 9 and an actuator device shown in FIGS. 10 to 15.

Figure 1:
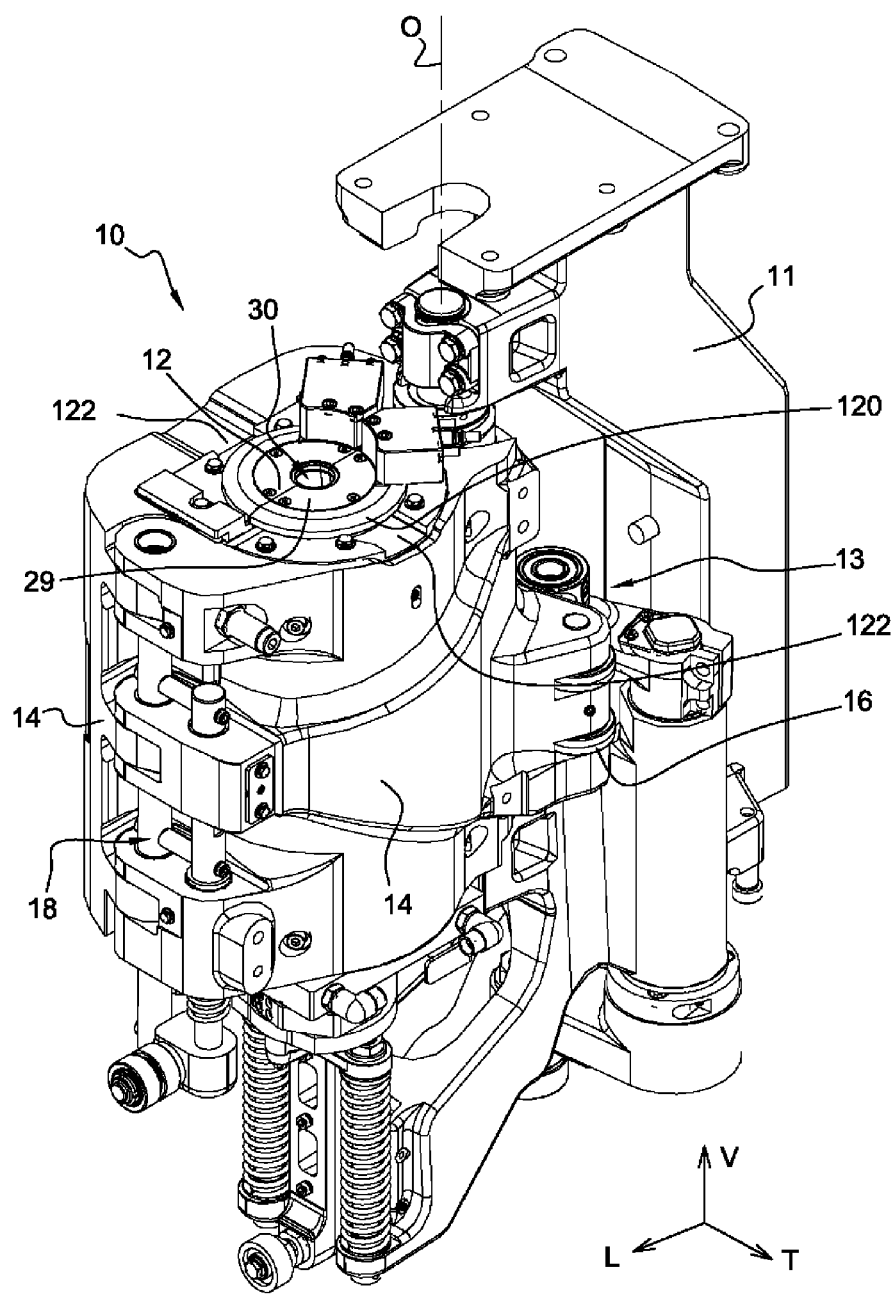

FIG. 1 shows a molding device 10 for a machine (not shown) for manufacturing thermoplastic material containers, the molding device 10 carried by a bracket 11 forming part of a forming station of such a blow-molding machine, for example.

The blow-molding machine includes a carousel provided circumferentially with a particular number "N" of forming stations including means (not shown) associated with the molding device 10 for transforming the preform into a container, for example blowing means or drawing-blowing means disposed above the molding device 10.

The molding device 10 is thus adapted to equip a machine for manufacturing thermoplastic material containers, in particular bottles, by forming a pre-heated preform by means of a pressurized fluid.

The molding device 10 shown in FIG. 1 nevertheless represents only one nonlimiting example of the type of molding device 10 which, equipping a "rotary" machine of this kind, is adapted to receive fixing means produced in accordance with the teachings of the invention.

As may be seen in FIG. 1, the molding device 10 includes at least one mold 12 constituted of two half-molds, namely a left-hand half-mold and a right-hand half-mold.

The two half-molds forming the mold 12 are adapted to be supported by respective mold-carriers 14, also respectively left-hand and right-hand, that are mounted so as to be mobile relative to each other about a rotation axis O.

To this end, the molding device 10 includes a fixing device including fixing means that are adapted to fix in a demountable manner to the mold-carriers 14 each half-mold occupying a mounted position or central reference position.

The molding device 10 shown in FIG. 1 is intended to equip a blowing station of a "rotary" type manufacturing machine, i.e. one generally including a carousel at the circumference of which are disposed stations each comprising a molding device 10 associated for example with blowing or drawing-blowing means (not shown).

For more details of the forming means such as the aforementioned blowing or drawing-blowing means, sometimes referred to as and produced in the form of a blowing nozzle, see for example the document FR-2 764 544.

In the example shown, the mold-carriers 14 are constituted in the form of two supporting structures mounted to pivot about a common rotation axis O, the rotation axis O here extending vertically according to the frame of reference (L, V, T).

Each mold-carrier 14 includes, in the longitudinal direction, a rear part that is complementary to the rear part of the other mold-carrier and that is conformed to interpenetrate with the latter in order to form an articulation 13, such as a hinge, the two parts whereof nevertheless pivot about the rotation axis O.

Alternatively, only one of the mold-carriers is mobile and the other mold-carrier is fixed, the mobile mold-carrier being driven to move between said open and closed positions.

Figure 2:
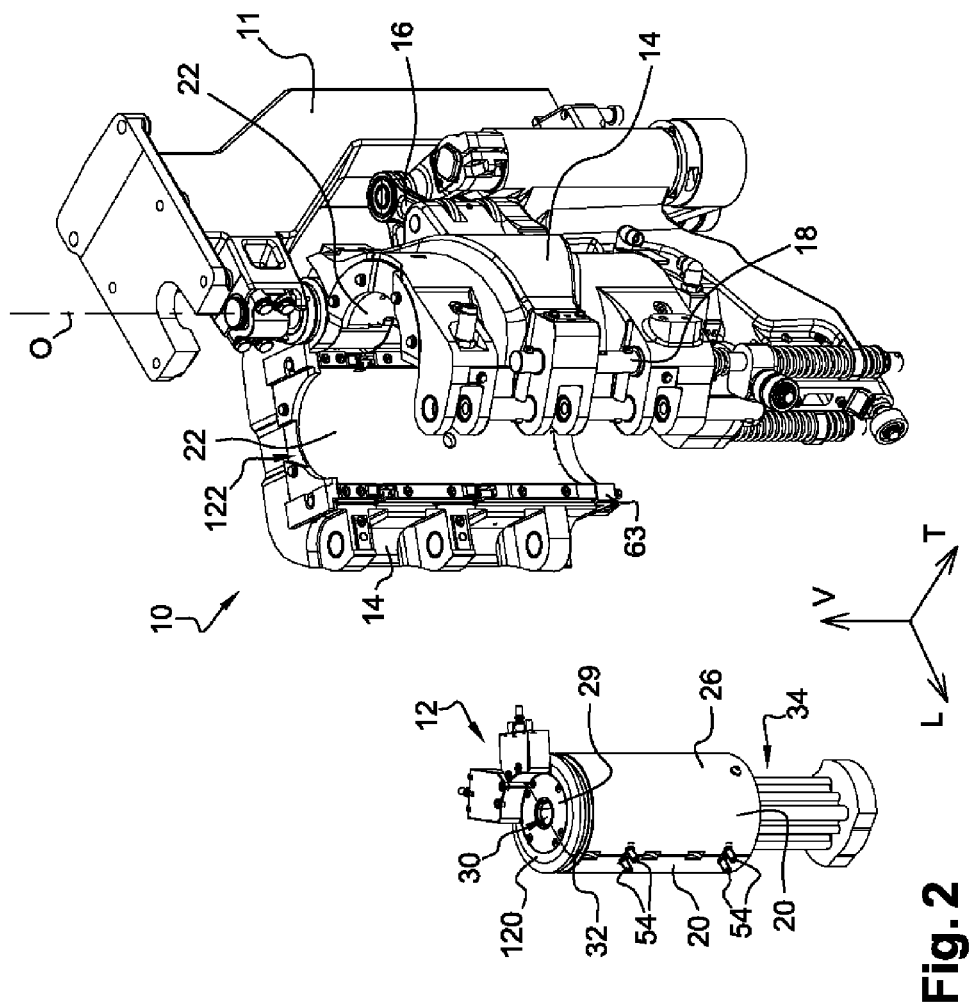

The mold-carriers 14 can then be moved away from each other by pivoting about the axis O and are consequently mounted so as to be mobile in rotation between at least a closed position (FIG. 1) and an open position (FIG. 2).

Given the kinematics of the mold carriers 14, such a molding device 10 is also known as a "book-like opening" mold.

In known manner, the mold-carriers 14 are driven between the open and closed positions by a system 16 of traction drive arms (see FIG. 2) one end of which is articulated to the mold-carriers 14 and the other end of which is connected to associated drive means, preferably of the roller and cam type.

This type of articulation of the mold-carriers 14 and the associated opening and closing drive means are as described in the document WO-A1-2004/018181, for example, which may advantageously be referred to for more details.

The molding device 10 further includes a lock 18 disposed longitudinally in the front part, i.e. opposite the pivoting articulation about the rotation axis O, and adapted to lock the two mold-carriers 14 in the closed position.

This kind of lock 18 is also known in the art and will therefore not be described in more detail, said lock 18 notably having the function of preventing inopportune opening during operations of transformation by injection of a pressurized fluid, such as compressed air in the case of blow-molding, where the final pressures may reach 40 bar.

For more details on the structure and the operation of a lock 18 see for example the document FR-2 2 646 802.

That is merely one example, of course, because there exist numerous different but equivalent locks able to provide the locking function.

Figure 3:
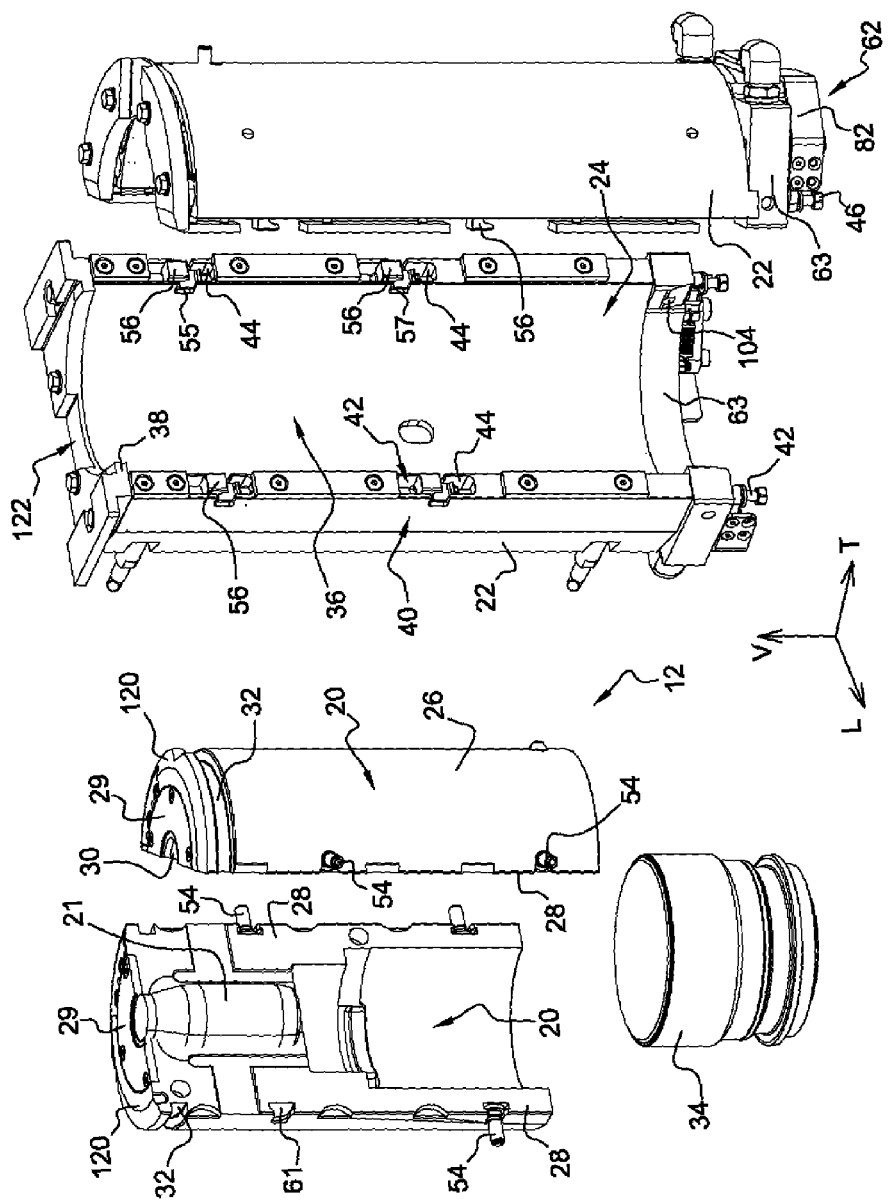
FIG. 3 is an exploded perspective view that shows the half-molds of the first embodiment which, provided with fixing means of the invention, are respectively constituted here of the two shells with which is associated a mold bottom and two shell-carriers adapted to be mounted on the mold-carriers and disposed between the latter and the shells.

As shown in FIG. 3, the molding device 10 is here preferably of the type in which each half-mold of the mold 12 is produced in two separate parts, namely a shell 20 provided with the half-imprint 21 of the container to be produced and a shell-carrier 22 adapted to support the shell 20 and to be fastened to one of the mold-carriers 14.

This design of the mold 12 has numerous advantages, notably as described in the aforementioned document EP-B1-0 821 641.

Alternatively, each half-mold may nevertheless be produced in one piece adapted to be fixed to one of the mold-carriers 14 by fixing means.

Each shell 20 includes a half-imprint 21 of the finished container that is recessed into an internal face 24. Here each internal face 24 is a plane vertical face that is formed by the section face of the cylinder forming the mold 12.

During manufacture, when the internal faces 24 lie against each other in a vertical molding plane to form the imprint of the container to be produced, the independent shells 20 (or half-shells) are then said to be in the joined position.

Each shell 20 has an external face 26 opposite the internal face 24 which has the overall shape of a circular half-cylinder substantially coaxial with the vertical axis X of the imprint of the container.

Centering means are advantageously provided to center the mold 12 in the circumferential direction relative to the mold-carriers 14, such as a peg projecting from the external face 26 of the shell 20 adapted to enter a complementary hole in the internal face of the shell-carrier 22.

Each shell 20 has two vertical rectilinear edges 28 which the internal face 24 and the external face 26 of the shell 20 join.

When the mold-carriers 14 are in the closed position, the two joined shells 20 together define an upper horizontal face having a central opening 30 intended to enable introduction of the preform.

The upper face of each shell 20 is preferably formed by a separate plate 29 rigidly attached to each shell 20. In the closed position, the joined plates 29 define a horizontal surface with which comes into contact the lower end of a nozzle (not shown) comprising the blowing or drawing-blowing means.

The upper parts of the shells 20, just below the upper horizontal face, also include a groove 32 that extends continuously in the circumferential direction around the two shells 20 when they are joined to produce the imprint.

If the container to be manufactured has a bottom of complex shape, in particular a petal shape, problems are then liable to occur when removing it from the mold.

This is why there is advantageously provided a separate mold bottom, separate from the half-molds or, as in the embodiment shown in FIG. 3, separate from the shells 20, said mold bottom including an imprint (not shown) of the bottom of the container complementary to the half-imprints 21.

The shapes of the shell 20 and the shell-carrier 22 are advantageously complementary so that the external face 26 of the shell 20 and the internal face 36 of the shell-carrier 22 are completely or partly in contact, pressed together, in particular to enable heat transfer by outward transverse conduction, i.e. from the shell 20 to the shell-carrier 22.

Each shell-carrier 22 is advantageously provided with interior conduits and associated connectors to allow circulation of a cooling (or heating) fluid in the shell-carrier 22 including the internal wall 36 against which the shell 20 is pressed.

The molding device 10 advantageously further includes positioning means operative between the shell-carrier 22 and the shell 20 together forming a half-mold, notably by cooperation of shapes such as ribs/grooves that cooperate with each other for positioning at least in the vertical direction.

In this embodiment the molding device 10 includes an upper part, here fastened to the shell-carrier 22, an internal edge 38 of which penetrates into the circular groove 32 of each shell 20.

The molding device 10 includes a fixing device provided with fixing means 40 adapted to fix in a demountable manner to the mold-carrier 14 each half-mold occupying a mounted or central reference position.

In this embodiment, the shell-carrier 22—although removable—is permanently mounted on the mold-carrier 14 and fastened thereto if it is necessary to demount each shell 20 including the half-imprint 21 only to change the mold, for example to manufacture a different container.

Consequently, the molding device 10 also includes reversible connecting means operative between each mold-carrier 14 and the shell-carrier 22 to fix them rigidly together.

To be more precise, the aforementioned fixing means 40 are consequently the means adapted to lock the shell 20 on the shell-carrier 22 since in the present example the half-mold is produced in two separate parts (and not in one piece).

Accordingly, in the case of a molding device 10 including for each mold-carrier 14 and a half-mold of the associated one-piece mold 12, the fixing means 40 are then operative to fix each half-mold directly to the mold-carrier 14.

According to the invention, the fixing means 40 of the device for fixing each half-mold to the mold-carrier 14 are adapted to be driven in movement between at least a fixing position and a release position when the mold-carriers 14 are in the closed position.

The means 40 for fixing each half-mold, here each shell 20, to the mold-carrier 14 are adapted to be actuated selectively to fix or to release each half-mold or shell 20 when the mold-carriers 14 are in the closed position.

The fixing means 40 of the invention are advantageously adapted in particular to allow introduction or removal of a unitary subassembly formed of at least the assembled half-molds by a movement in translation.

Such fixing means of a first embodiment of the invention are described next by way of nonlimiting example.

The means 40 for fixing each half-mold to the mold-carrier 14, i.e. in this example for fixing each shell 20 to the shell-carrier 22, are of mechanical type and result from cooperation of shapes between two elements connected to the respective parts.

Figure 4:
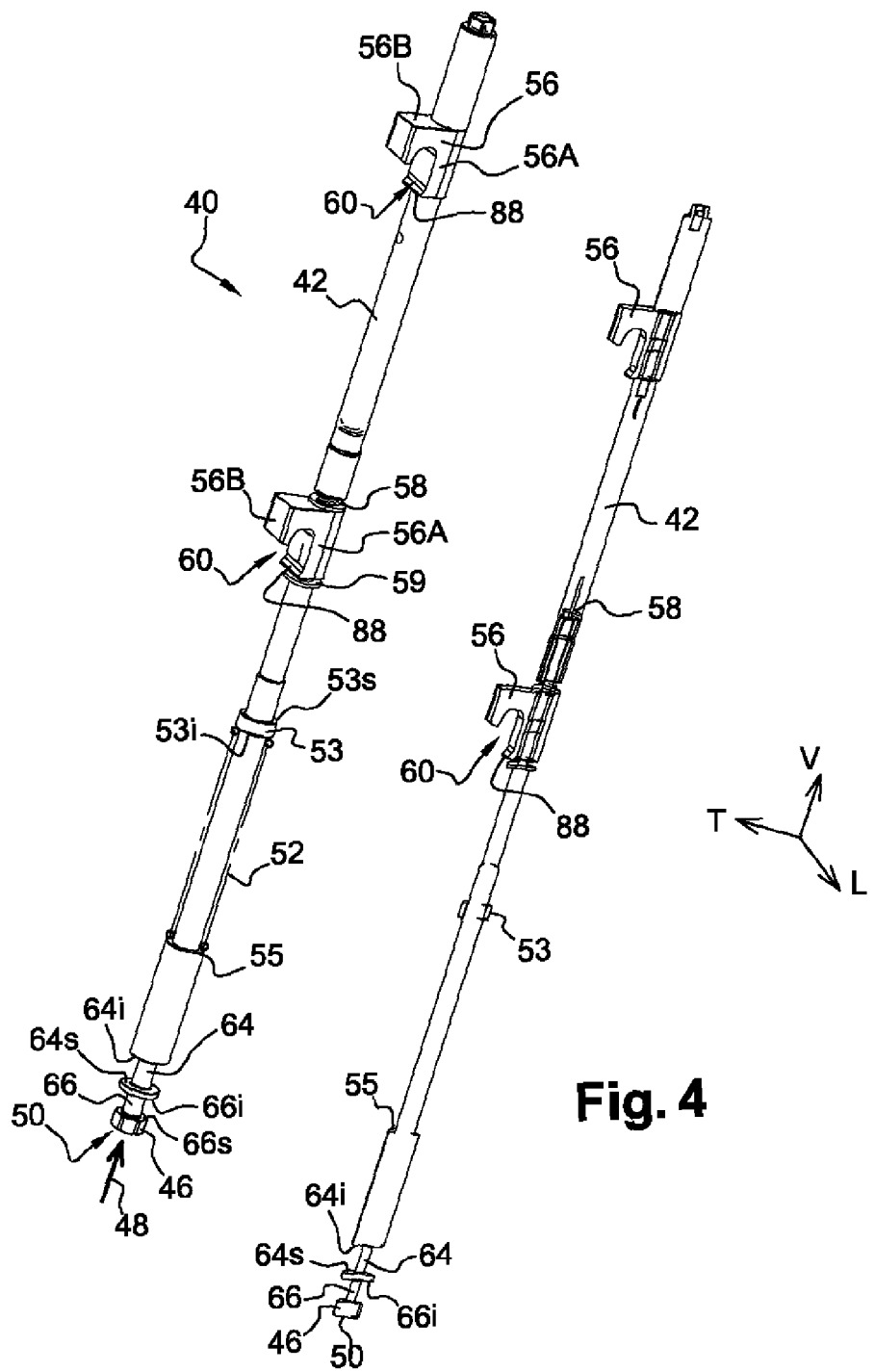
FIG. 4 is a perspective view that shows in detail two actuator members one of which is shown in section on a vertical plane, each member being provided with second fixing elements formed by hooks in this first embodiment.

The fixing means 40 advantageously include at least one actuator member 42 that is shown in detail in FIG. 4, respectively in perspective and in section on a vertical plane.

The actuator member 42 advantageously includes at least one drive part 46 that is adapted to be driven in movement from outside the molding device 10, i.e. without necessarily requiring the mold-carriers 14 to be in the open position to allow access to the fixing means 40.

The fact that the fixing means can be actuated regardless of the open or closed position of the mold-carriers 14 of the molding device 10 eliminates the obligation to open the mold-carriers, as was previously obligatory although somewhat impractical for reaching the fixing means.

The actuator member 42 is preferably carried by the molding device 10, more precisely by the half-mold or here by the shell-carrier 22.

Alternatively, the actuator member 42 could equally be carried by the shell 20. However, the aim is generally to design the molding device 10 in such a manner as to have a mold 12 that is as simple as possible and consequently of lower manufacturing cost.

Figure 5:
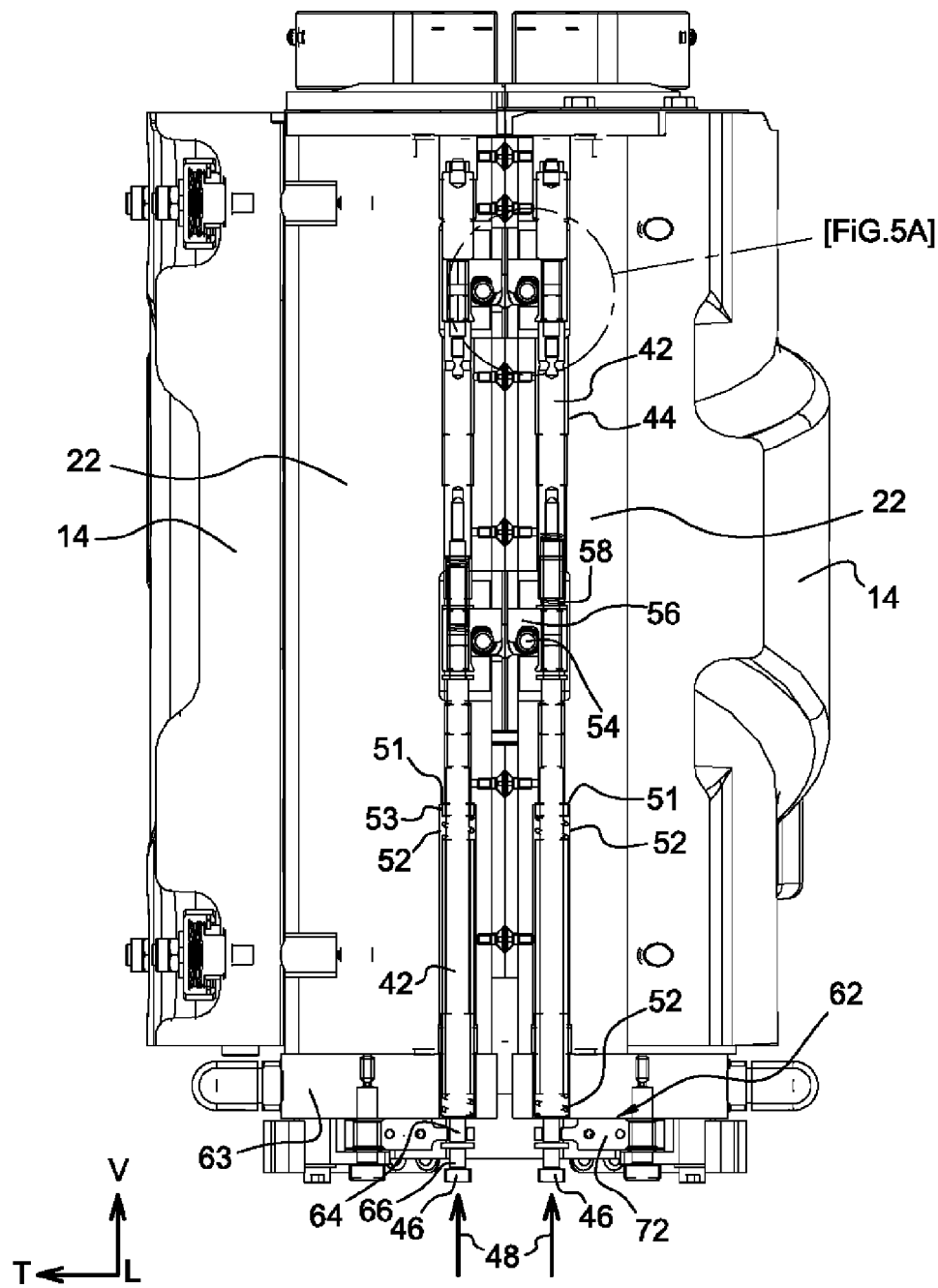
FIGS. 5 and 6 are front views that show a molding device in the closed position and show in vertical section the fixing means of the first embodiment of the invention, each actuator member being mounted in the shell-carrier and shown in fixing and release positions, respectively, notably in the detail views of FIGS. 5A and 6A showing the first and second fixing means.
Figure 6:
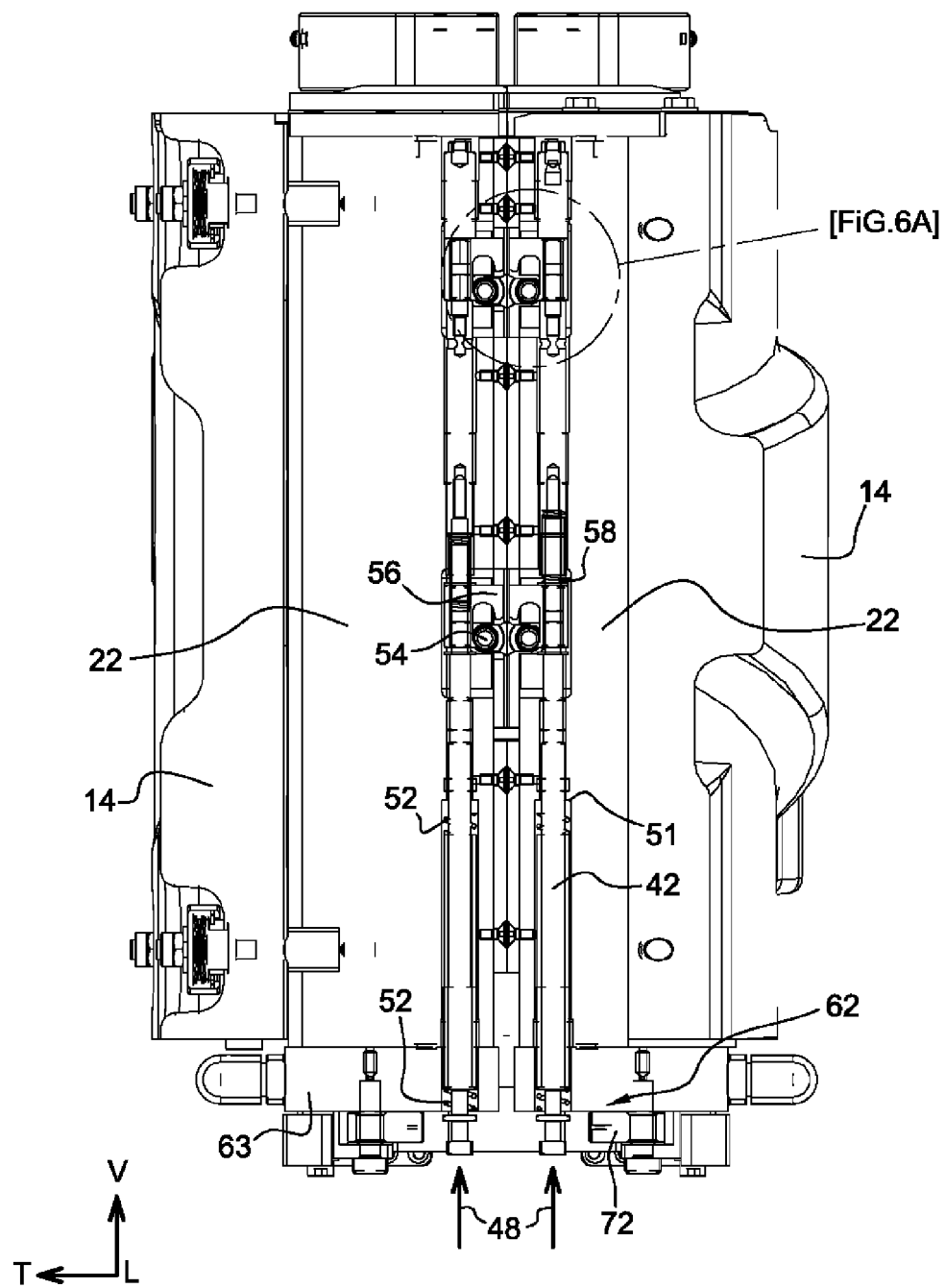
Figure 6A:
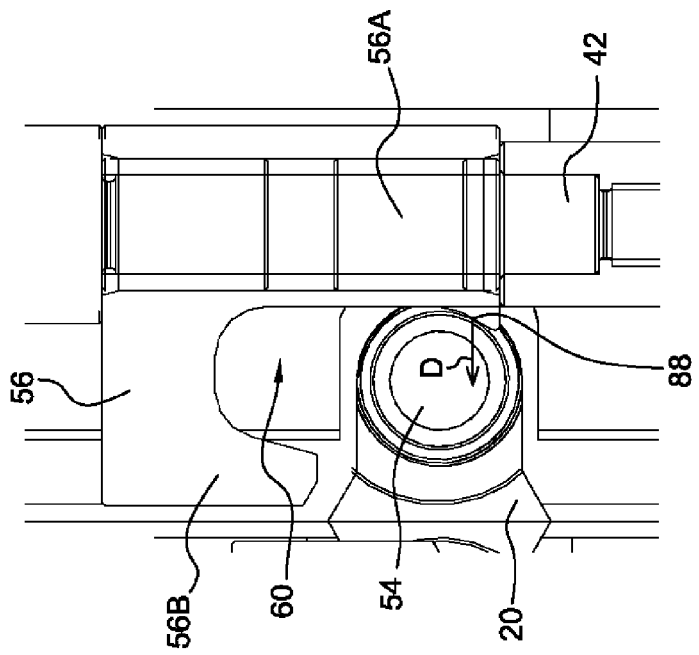
Figure 5A:
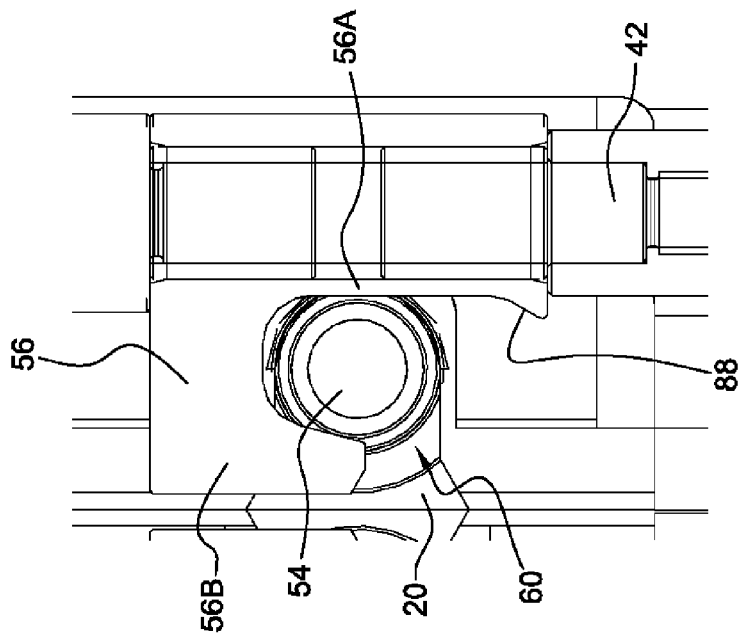

The actuator member 42 carrying the fixing means 40 is mounted to be mobile between at least a fixing position and a release position that are shown in FIGS. 5 and 6, respectively.

The actuator member 42 is carried by the molding device 10, preferably mounted on the shell-carrier 22 in each edge of which at least one complementary recess 44 is provided for this purpose.

The fixing means 40 are advantageously provided on at least one side at the interface of the edges, here the vertical edges, of the shell-carrier 22 and the shell 20, respectively (of the mold-carrier and the half-mold in a two-part embodiment).

The fixing means 40 and in particular the actuator member 42 here are integrated into the molding device 10 in such a manner that the latter is notably compact.

It is important for a rotary blow molding machine that each molding device have a small overall size in order to allow the installation of the greatest number of stations on the circumference of the carousel of the machine and to do so with no risk of interference on opening at least one of the molding devices 10 that are juxtaposed thereon side-by-side.

The actuator member 42 of the fixing means is in particular characterized in that it may be actuated when the mold-carriers 14 are in the closed position.

The drive part 46 of the actuator member 42 preferably projects out of the recess 44 at the lower end of the shell-carrier 22.

The actuator member 42 for the fixing means 40 shown in detail in FIG. 4 has the overall shape of a rod.

The actuator member 42 for the fixing means 40 include a rod a lower section of which constitutes the part 46 for driving movement of the actuator member 42.

Movement of the actuator member 42 for the fixing means 40, here via the drive part 46, is advantageously driven from outside the molding device 10 to cause the release or the fixing of each half-mold to the mold-carrier by the fixing means and to do so regardless of the open or closed position of the mold-carriers 14 of the molding device 10.

When the actuator member 42 is mounted in its recess 44, the drive part 46 preferably projects out of the molding device 10, i.e. lies at least in part outside the recess 44 of the shell-carrier 22, in such a manner as to allow movement of said actuator member 42 to be driven by actuator means of an actuator device that is also external, here below the molding device 10.

In a variant that is not shown, movement of the actuator member 42 is driven from outside the molding device 10 without the drive part 46 projecting.

By way of nonlimiting example of such a variant, the drive part 46 of the member 42 could be inside the recess 44 of the shell-carrier 22 or another rigidly fastened part, in which case the actuator means are designed to penetrate from into the heart of the device the outside in order to act on said drive part 46.

Of course, it is possible for the actuator means also to be integrated into the shell-carrier 22, all this depending on the choice of the drive system including said actuator means.

The actuator member 42 for the fixing means 40 is adapted to be actuated selectively by a drive system 48 including actuator means 106 for causing it to slide between said positions of fixing and releasing the fixing means 40 of each shell 20.

The actuator member 42 preferably slides vertically between said fixing and release positions.

In a variant that is not shown, the actuator member 42 is disposed with a different orientation, for example to slide in the transverse direction, in a horizontal plane orthogonal to the vertical direction.

The actuator member 42 may nevertheless be mounted so as to be mobile between the fixing and release positions according to a kinematic other than sliding.

In a variant that is not shown, the actuator member 42 is mounted so as to be mobile in rotation between the fixing and release positions while acting on the fixing means.

The drive system 48 advantageously includes actuator means that cooperate with a drive face 50 of the drive part 46, at the free end of the lower section, of the actuator member 42.

The fixing means 40 preferably include spring return means 52 that urge the actuator member 42 toward the fixing position so that said member 42 is returned automatically toward said fixing position.

The drive system 48 is diagrammatically represented by an arrow in FIGS. 4, 5 and 6.

The actuator member 42 mounted in the recess 44 of the shell-carrier 22 is able to slide against a spring return member 52 such as a compression spring.

The return spring 52 is mounted around the actuator member 42, which passes through its turns, for example around the lower section of the member 42, and disposed vertically above the drive part 46 situated at the lower end.

As may be seen better in the FIGS. 5 and 6 sections, the upper end of the return spring 52 bears against a lower face 53i of a ring 53 that is adapted to bear via its upper face 53s against a shoulder 51 provided for this purpose in the recess 44 and the lower end of the spring 52 cooperates with an upper face of a shoulder 55 of the actuator member 42.

When the actuator member 42 is moved by means of a drive system 48 from the fixing position shown in FIG. 5 toward the release position shown in FIG. 6, the return spring 52, which is compressed at this time, exerts a vertical downward return force on the shoulder 55 of the actuator member 42.

Alternatively, the actuator member 42 includes no return spring 52 with the result that the sliding of the member 42 between its fixing and release positions then depends on the force applied to the part 46 by the actuator means of the drive system 48.

The fixing means 40 are advantageously integrated into the molding device 10 to produce a compact device.

Such compactness of the molding device is particularly important for a rotary machine in which the number N of stations for a given diameter of the carousel results in part directly therefrom, because the molding devices or stations of the book-like opening type require a minimum space between two consecutive stations to open the mold-carriers by rotation about the axis O.

The fixing means 40 are advantageously at least in part integrated into the interior of the molding device 10 and are disposed between the edge 28 of the shell 20 (or half-mold) and the facing edge of the shell carrier 22 (or mold-carrier), said edges being parallel to the rotation axis O, in such manner as to fix the shell 20 (or half-mold) at one or both of its edges 28.

The fixing means 40 are preferably arranged on either side of the half-imprint 21, on each edge 28 of the shell 20 (or half-mold), i.e. here diametrally opposite in the longitudinal direction, at the level of the vertical molding plane or joint plane.

The respective fixing means 40 include at least one fixing element 54 that is rigidly fastened to each half-mold, here each shell 20, and at least one other fixing element 56 which, complementary to said element 54, is adapted to be moved by the actuator member 42.

In this embodiment, said at least one fixing element fastened to each half-mold is a first fixing element 54 of male type, such as a peg, and said at least one other fixing element 56 connected to the actuator member 42 is a second fixing element of female type, such as a hook.

Said at least one second fixing element 56 is preferably carried by the actuator member 42 so that sliding of the member 42 between the fixing and release positions is simultaneously accompanied by movement of the second fixing element 56.

In a variant that is not shown, the second fixing element 56 is carried by another part, such as the shell-carrier 22 (or the mold-carrier 14) and disposed for example in the recess 44, and the second element 56 is mounted so as to mobile between a first position and a second position, respectively referred to by analogy as release and fixing positions.

In such a variant, the actuator member 42 is advantageously able to cause movement of said second element between said first and second positions when it is itself driven in movement by a drive device 48 to slide between at least two positions corresponding to the fixing or release states of the fixing means 40.

Thus the fixing means 40 (more particularly said second element 56) are adapted to be actuated between the fixing and release positions by the actuator member 42.

The first fixing element 54 is for example a male member while the second element is a female element.

In the embodiment shown in the figures, the first fixing element 54 is a peg while the second fixing element 56 is a hook of complementary shape to said peg 54, with which it is adapted to cooperate.

Alternatively, the first fixing element 54 connected to the half-molds is a female element, for example a detent, while the second fixing element 56 is a male element, for example a lug.

In a variant of this kind, the female element corresponding to the first fixing element 54 is advantageously associated with the shells 20 (or half-molds) in which a "hollow" element, such as a detent, is produced by machining, for example. Thus the shells 20 or half-molds that are frequently manipulated during change of mold operations have no projecting parts that are naturally more exposed to suffer impacts in particular.

If the female element corresponding to the first fixing element 54 is associated with each shell 20 (or a half-mold), it is still preferably possible to provide at least two different types of female element.

Accordingly, at least one edge of the same shell may include two different types of female element in such a manner as to allow mounting and demounting of a mold on a molding device of a given machine equipped with a first type of fixing device or another equipped with a second type of fixing device respectively including different "male" second fixing elements.

Alternatively, one edge of the same shell could also include demountable male or female elements for respectively allowing use with at least two different fixing devices.

Thus an existing shell 20 (or a half-mold) is advantageously adapted to be modified to add to it a first or a second fixing element (for example a peg or a detent) in order to enable polyvalent use in a molding device of a station including a fixing device of the invention.

This is no more than a nonlimiting example, of course, if numerous complementary elements 54, 56 may be used to achieve such cooperation of shapes able to guarantee fixing between each of the respective two parts carrying one of the first and second elements.

As shown in FIG. 2 or 3 for the first embodiment, each shell 20 preferably includes four pegs 54, respectively two upper pegs 54 and two lower pegs 54 that are superposed one above the other on each of the edges 28 of the shell 20, each of which therefore includes a pair of pegs 54.

The pegs 54 are preferably separate elements that are rigidly attached to each edge 28 of the shell 20 which for this purpose includes a recess 61 seen more particularly in FIG. 3 where an upper peg 54 has been omitted on the left-hand shell 20.

Such a shell 20 advantageously has a particularly simple shape that may be produced by molding without additional manufacturing costs and it is also possible to modify the prior art shells 20 easily by making the modifications to them necessary to install the pegs.

Moreover, the pegs 54 may then be produced in a chosen material, different from that used for the shell 20.

Alternatively, the pegs forming the first fixing elements may be integral with, i.e. made in one piece with, the shell 20.

Each shell 20 advantageously includes diametrically opposed first means 54 of the fixing means 40 on its edges.

The fixing means 40 also include two associated actuator members 42 each of which is disposed in a recess 44 provided on each edge of the shell-carrier 22.

Each actuator member 42 includes two hooks 56 forming the second fixing elements and that are respectively associated with each pair of pegs 54 carried by an edge of the shell 20.

Each actuator member 42 therefore preferably includes an upper hook 56 and a lower hook 56 adapted to cooperate with upper and lower pegs 54.

One of the hooks 56 is advantageously connected to said actuator member 42 with play in the vertical sliding direction, i.e. by a connection with play allowing movement of the hook 56 relative to the actuator member 42.

To form said connection with play, the lower hook 56 is preferably connected to the actuator member 42 via a spring member 58 forming play take-up means adapted to guarantee correct positioning in the fixing or release position of each hook 56 with the associated peg 54, notably by compensating tolerances.

Such a connection guarantees correct positioning of the lower hook 56 independently of that of the upper hook 56 fixedly connected to the actuator member 42.

As shown in FIG. 4, the upper end of the spring member 58 bears against the lower face of a shoulder on the actuator member 42 while the lower end loads the upper face of the hook 56 disposed below said spring 58.

The lower hook 56 is therefore not fixed like the upper hook 56 and it is free to be moved vertically relative to the actuator member 42 against the action of the spring 58 and within the limits of a play or range of movement determined by an upper abutment face 59 that is rigidly fastened to the actuator member 42 and with which the lower hook 56 is adapted to cooperate.

Each hook 56 has the overall shape of an inverted "L" including a first vertically oriented branch 56A connected to the actuator member 42 and a second branch 56B orthogonal to the first and here oriented transversely, which with the first branch 56A delimits a generally U-shaped recess 60 in which a complementary peg 54 is adapted to be engaged in the fixing position.

Accordingly, and as described above with reference to FIGS. 5 and 6, the drive part 46 of each member 42 is selectively loaded by the actuator means of a drive system 48 to cause movement of the actuator member 42 between the fixing and release positions.

The fixing position then corresponds to the position of the fixing means 40 in which each hook 56 cooperates with the peg 54 of the shell 20 engaged in the recess 60 in order to press the shell 20 against the shell-carrier 22.

Whereas the release position corresponds to the position in which each hook 56 is retracted in order not to interfere with the peg 54 of the shell 20 occupying said mounted position.

In the mounted position of the shell 20, each peg 54 penetrates via a notch 57 into the recess 44 of the shell-carrier 22 in which is mounted the actuator member 42 carrying the fixing hooks 56.

In the fixing position shown in FIG. 5, each peg 54 is received in the recess 60 of the associated hook 56, which grips it and thus fixes the shell 20 in the shell-carrier 22 at least in the transverse direction.

Apart from the fixing means 40, each shell 20 is retained vertically by the cooperation of shapes between the circular edge 38 connected to the shell-carrier 22 and the groove 32 of the shell 20.

Each hook 56 advantageously assures fixing by exerting on the peg 54 a clamping force corresponding to an attraction force having at least transversely oriented component that is exerted on the peg 54 in the direction from the interior toward the exterior so as to press the external face 26 of the shell 20 intimately against the internal face 36 of the shell-carrier 22.

Thanks to the attraction force resulting from the cooperation between the pegs 54 and the hooks 56 of the fixing means 40, the external face 26 of the shell 20 and the internal face 36 of the shell-carrier 22 are in thermal conduction contact with each other, wholly or in part depending on the application.

Thus satisfactory thermal transfer is advantageously obtained to the shell-carrier 22 provided with cooling means of the circulating fluid type.

In the first embodiment, the molding device 10 advantageously includes a locking system 62 associated with the fixing means 40 which is selectively actuated to lock the actuator member 42 in the fixing position and/or in the release position.

One embodiment of such a locking system 62 shown more particularly in FIGS. 7 to 9 is described next in a manner that is not limiting on the invention.

The locking system 62 is for example mounted on the exterior of a plate 63 disposed in the lower part of the molding device 10 and rigidly fastened to the shell-carrier 22.

The locking system 62 is adjacent the drive part 46, locking preferably being effected on the lower section of the actuator member which, disposed vertically just above said drive part 46, also projects downward out of the shell-carrier 22.

Firstly, as shown in FIG. 4, the actuator member 42 includes a first detent 64 and a second detent 66, or alternatively at least one detent.

The first and second detents 64 and 66 are respectively formed by an annular groove that is produced in the lower section of the actuator member 42, vertically above the drive part 46, the first detent 64 being itself disposed above the second detent 66.

The first detent 64 is delimited vertically by a lower bearing face 64i and by an upper face 64s and the second detent 66 is delimited by a lower bearing face 66i and an upper abutment face 66s.

The locking system 62 includes a support 68 a first part of which is rigidly fixed to the plate 63 by means of a first fixing member 69 such as a screw, and a second part of which is rigidly fixed to the plate 63 by a second fixing member 70.

The locking system 62 includes at least one locking element 72 formed by a latch that is mounted to pivot at one of its ends about the second fixing member 70 and the other end of which is a free locking end and includes a locking notch 74 of complementary shape to the first and second detents 64, 66.

The locking latch 72 is mounted to be mobile between:
an unlocked position shown in FIG. 8 in which the locking latch 72 is retracted to leave the actuator member 42 free to slide between its fixing and release positions, and
a locked position in which the locking latch 72 selectively cooperates with the first detent 64 (FIG. 7) or with the second detent 66 (FIG. 9) of the actuator member 42, said detents 64, 66 respectively corresponding to the fixing position and to the release position of the actuator member 42 for the fixing means 40.

The locking latch 72 includes, between said ends, a lug 76 to which is attached one end of a return spring member 80, here a spring, the other end of which is attached to a stud 78 rigidly fastened to the plate 63 and forming a fixed anchor point.

The locking system 62 includes driving means 82 that are adapted to cause movement of the locking latch 72 from the locked position toward the unlocked position against the action of the spring return member 80.

Thus the spring member 80 loads the locking latch 72 by exerting on the lug 76 of the latch 72 a return force that returns the latch 72 automatically toward the locked position in one or the other of the detents 64, 66.

The driving means 82 of the locking system 62 take the form of an drive arm having an open overall shape or "U" shape.

The drive arm 82 includes a first part 84 that is fixedly attached, for example screwed, to the part of the locking latch 72 opposite the lug 76, and an intermediate part that is extended by a second part 86 forming the free end of the drive arm 82.

Unlocking is obtained by applying an unlocking force to said part 86 to cause the locking latch 72 to pivot from the locking position toward the unlocking position against the action of the return member 80 of the latch 72.

The support 68 advantageously forms an end of travel abutment against which part of the drive arm 82 comes to bear when an unlocking force is applied to the part 86 and that corresponds to a travel sufficient to guarantee unlocking of the latch 72 against the action of the return member 80.

The locking system 62 is preferably an unstable system the only stable state of which corresponds to the locked position, and thus retention of the system in the unlocked position can be obtained only by the permanent application of a sufficient unlocking force F to the part 86 of the drive arm 82.

FIG. 8 shows diagrammatically by means of an arrow F the unlocking force F of this type applied to the part 86 of the drive arm 82.

If the application of such a force ceases or the force applied to the latch 72 via the drive arm 82 is less than the return force exerted by the spring return member 80, said member 80 then automatically returns the locking latch 72 to the locked position.

As may be seen in FIGS. 7 and 9, when the locking latch 72 is in the locked position in the first detent 64, the latch 72 bears against the lower bearing face 64i, and when the locking latch 72 is in the locked position in the second detent 66, the latch 72 bears against the lower bearing face 66i.

A locking system 62 such as that of the embodiment that has just been described with reference to FIGS. 7 to 9 is optional if it does not condition operation of the fixing means 40 of the invention.

Nevertheless, such a locking system 62 has undoubted advantages the main ones of which are described hereinafter.

Firstly the locking system 62 enables fixing of the shell 20 to the shell-carrier 22 to be guaranteed even if the return spring 52 that urges the actuator member 42 toward the fixing position were to fail, for example break.

This is why the actuator member 42 includes the first detent 64 enabling locking of the fixing position.

It will thus be clear that the actuator member 42 could consequently not include a first detent 64 of this kind but only a second detent 66 so that only the release position could then be locked by the locking system 62.

Thanks to the second detent 66 for locking the actuator member 42 in the release position, the locking system 62 then enables temporary and not permanent application of the unlocking force to the drive part 46 by the actuator means of the drive system 48.

Sliding of the actuator member 42 from the fixing position to the release position is effected against the action of the return spring 52.

Accordingly, in the absence of such locking of the actuator member 42 once said release position has been reached, it would be necessary to apply a permanent unlocking force greater than the return force of the spring 52, failing which the latter would immediately cause the actuator member 42 to be returned to the fixing position.

Locking the actuator member 42 in the release position advantageously enables temporary actuation of the actuator means of the drive system 48, with the notable benefit of energy saving.

Thanks to locking of the release position, it is then possible to manipulate each shell 20, for example to change it, independently of the presence or absence of a drive system 48, no unlocking force having to be applied to the drive part 46.

Moreover, a new shell 20 can then be fixed quickly and simply by actuation of the drive arm 82, as shown in FIG. 8, causing the locking system 62 to be unlocked.

By unlocking the locking latch 72 and by virtue of the presence of the spring 52, return of the actuator member 42 toward the fixing position is then automatic.

Note that, once again, the presence of the drive system 48 is not necessary.

The drive system 48 is used in the first embodiment shown in FIGS. 1 to 15 only to command the sliding of the actuator member 42 from the fixing position to the release position and as far as locking the actuator member 42 when the release position is reached.

Moreover, the second detent 66 is "wider", i.e. it has a vertical dimension greater than that of the first detent 64, the dimensions of which here correspond substantially to those of the locking latch 72.

The second detent 66 of the actuator member 42 and the locking latch 72 are advantageously conformed to have some play in the vertical sliding direction to allow the member 42 to move beyond the release position.

Thanks to this, means 88 for unsticking the half-mold, here the shell 20, from the mold-carrier 14 are selectively actuated via the actuator means of the drive system 48.

The unsticking means 88 are advantageously constituted by a ramp part that is carried by each hook 56 and that is disposed on the vertical branch 56A of the hook at the entrance of the recess 60 for the peg 54.

As shown in FIGS. 4 and 6, the unsticking ramp 88 of the hook 56 is adapted to exert an unsticking force on the peg 54 when the actuator means load the actuator member 42 to cause it to slide beyond the release position, by an overtravel determined by said vertical play of the second detent 66 corresponding to the distance between the lower or bearing face 66i and the upper or abutment face 66s.

an arrow D diagrammatically represents the transversely oriented component of the force corresponding to the unsticking force applied to the peg 54 by the ramp 88 of the hook 56.

At least one embodiment of a drive system 48 of the fixing means 40 is described by way of nonlimiting example.

The drive system 48 is of the "mechanical" type, for example, adapted to be actuated manually, i.e. manipulated directly by hand by an operator.

Of course, the actuator means could instead be partly or fully automated, notably using an actuator, such as a piston-and-cylinder actuator or a motor driving a rod.

Moreover, an actuator of this kind may be of the pneumatic, hydraulic or electrical type to supply the actuator means with the energy necessary for the application to the drive part 46 of the actuator member 42 a force to release the fixing means 40 against the action of the spring return member 52 for returning the member 42 toward the fixing position.

Of course, in addition to the drive system 48, it is equally possible to automate the locking system 62, for example also by means of such actuators, for selectively unlocking the locking latch 72.

Unlocking is then advantageously synchronized with the actuator means of the drive system 48 acting on the actuator member 42.

Synchronizing the actuators of the locking system 62 and the drive system 48 then unlocks the system 62 beforehand and during actuation of the member 42 by the actuator means to cause the released member to slide from its fixing position as far as the release position and then to lock the system 62 again when said release position is reached; once the member 42 is locked in the release position, actuation of the drive system 48 may then cease.

By way of nonlimiting example, the mechanical drive system is a toggle clamp.

Such a device is adapted to transform a rotation movement into a translation movement.

The drive system 48 advantageously includes a fixing bracket by means of which it is permanently mounted on the plate 63 of each shell-carrier 22 of the drive system 48.

The drive system 48 includes a lever that is mounted to rotate between at least a first position and a second position about a shaft carried by the bracket.

The first position of the drive system 48 corresponds to the fixing position of the fixing means 40 and the second position corresponds to the release position of said means 40.

The lever of the system 48 is connected to the lower end of a rod forming actuator means and the other, upper end of which is advantageously connected to move with the lower end of the actuator member 42 of the fixing means 40.

When the lever 210 is moved, for example, to rotate 180° from its first position corresponding to the fixing position to its second position corresponding to the release position, the rod slides vertically upward.

The fixing means 40 are adapted to enable removal or introduction of half-mold from or into the reset of the mold-carrier 14 by a movement and translation globally orthogonal to the mold-carrier 14.

The fixing means 40 are advantageously disposed on each of the two edges of the shell 20 and the shell-carrier 22 in such a manner as to enable such movement in translation.

Of course, the fixing means 40 are also able to be implanted on a part other than the two edges of the shell 20 and the shell-carrier 22, notably between the external face of the shell 20 and the internal face of the shell-carrier 14 delimiting the recess.

In the first embodiment, the fixing means 40 are therefore duplicated so that it is necessary to drive the movement of both actuator members 42 adapted to immobilize each of the edges 28 of the shell 20.

The drive device 48 advantageously includes actuator means adapted to actuate the two actuator members 42 for each half-mold or shell 20, preferably simultaneously.

A mold changing method according to the invention is described next in which actuation of the fixing means by the drive system occurs when the mold-carriers 14 of the molding device 10 are in the closed position, thanks to which the time to change a mold is further and significantly reduced.

The mold 12 is therefore preferably constituted of two half-molds produced in two parts, namely a shell 20 and a shell-carrier 22 as indicated above.

According to a particularly advantageous feature of the invention, the fixing means 40 are also adapted to be driven when the mold-carriers 14 are in the closed position.

Thus the fixing means 40 of the invention may be driven when the mold-carriers 14 are in the open position and when the mold-carriers 14 are in the closed position.

Movement of the drive part 46 of the actuator member 42 is adapted to be driven from outside the molding device 10 regardless of the open or closed position of the mold-carriers 14 of the molding device 10.

In a manner that is not limiting on the invention, the drive part 46 of each actuator member preferably projects from the molding device 10 so that it is possible to act on the drive part 46 independently of the open or closed position and very particularly by comparison with the known prior art solutions including in the closed position.

Although the various steps relating to the fixing means of the invention may be performed manually by at least one operator, the steps are thus preferably automated by means of appropriate actuators and intervention by the operator at least limited or even eliminated.

In particular, automating the driving of the locking system to unlock the latch and/or to actuate the member 42 advantageously enables further reduction of the time necessary to change a mold 12.

In this method of changing the mold 12, the steps described hereinafter are carried out when the mold-carriers 14 of the molding device 10 are in the closed position.

The molding device 10 is preferably moved beforehand into a particular area of the manufacturing machine to change a mold.

In a rotary machine, such an area is for example situated on the opposite side of the machine to that in which the preforms are introduced and the finished containers removed.

FIGS. 10 and 11 show very diagrammatically the steps of the method of the invention of changing a mold.

In the mold changing method of the invention, there is first carried out a step (a) consisting in driving the fixing means 40 to release each half-mold when the mold-carriers 14 occupy the closed position.

With the fixing means 40 of the first embodiment, the step (a) notably includes the sub-steps described hereinafter.

In FIG. 10, the molding device 10 is shown with the mold-carriers 14 in the closed position and the fixing means in the fixing position, which also corresponds to FIG. 5. A bold line has been used to symbolize the fixing between the half-mold or shell 20 and the mold-carrier 14.

When the fixing means 40 conform to the first embodiment, the step (a) notably includes the substeps described hereinafter.

In a first substep (a1) unlocking of the locking systems 62 is commanded in order to release each of the actuator members 42 of the fixing means 40.

Generally speaking, the substep (a1) consists in actuating unlocking of at least one actuator member of the fixing means occupying a fixing position to release said actuator member.

The locking system 62 of the first embodiment merely constitutes one nonlimiting example of means adapted to provide such locking of at least one of the fixing and release positions.

As indicated above, the drive device adapted to drive the movement, here the sliding, of the actuator member 42 of the fixing means 40 may be constituted by an actuator such as a pneumatic or hydraulic cylinder.

An actuator is advantageously also adapted selectively to provide the function of locking the actuator member, in particular in the release position, thanks to a single-acting cylinder for example.

Alternatively, a double-acting cylinder is used if it is required to lock both the release and fixing positions, notably the fixing position independently of any risk of failure of a spring member for returning the actuator member 42 toward the fixing position.

The first substep (a1) is executed for each of the shells 20, advantageously simultaneously.

For each shell 20, first actuator means (not shown) such as a controlled actuator are used that are adapted to actuate at least one locking system 62.

Each actuator is advantageously adapted to actuate both locking systems of a shell 20 simultaneously.

Alternatively, the locking system 62 is actuated manually by an operator who exerts the unlocking force and carries out in succession the sub-steps for one shell 20 and then for the other shell 20.

Thus the actuator is actuated so that, in each of the systems 62, the locking latch 72 is disengaged from the first detent 64 of the actuator member 42 so that the actuator member 42 may be caused to slide from its fixing position toward its release position.

As shown in FIG. 8, the controlled actuator is adapted to exert an unlocking force F transversely from the exterior toward the interior on the part 86 of each of the drive arms 82 over a travel determined by each locking system 62 coming into abutment against the support 68.

This being so, the actuator effects the required unlocking in each locking system 62 associated with the actuator member 42, i.e. pivoting of the locking latch 72 about its axis to the unlocked position against the action of the member 80 returning the latch 72 elastically toward the locked position.

Each latch 72, driven by the part 84 of the drive arm to which it is rigidly fastened, pivots toward the unlocked position in which the notch 74 of the latch 72 is released, neither of the detents 64 or 66 being any longer engaged therein.

It will be noted that the parts 86 of each of the drive arms 82 of each locking system associated with respective actuator members 42 are adjacent and sufficiently near each other for the actuator to be able to load them simultaneously in order to bring about the unlocking of each locking latch 72 of the two systems 62 that a shell 20 includes.

As explained above, the locking system 62 of the embodiment of FIGS. 7 to 9 is not a bistable system, i.e. the unlocked position is not a stable position, with the result that the operator must, with one hand, maintain their force on the drive arms 82 at least until the member 42 is actuated by the drive system 48 (failing which the latches 72 will be returned automatically to the locked position by the springs 80).

Once the locking system 62 has been unlocked in the substep (a1), the actuator member 42 is then free to be actuated by the drive system 48 in order to cause it to slide against the action of the spring 52 from the fixing position toward the release position.

Of course, the substep (a1) is executed only if the molding device 10 includes such a locking system 62 which, although it may be dispensed with, has various advantages described above.

In a second substep (a2), each actuator member 42 being unlocked, the drive system 48 is actuated to cause the fixing means 40 to slide from the fixing position to the release position.

Generally speaking, the substep (a2) consists in actuating the drive device 48 to slide an actuator member 42 of the fixing means 40 from a fixing position to a release position.

As shown in FIG. 6, execution of the second substep (a2) depends of course on the drive system 48 used.

The drive system 48 is advantageously also an actuator adapted to load selectively the drive part 46 of each of the two actuator members 42 associated with the shell 20 in order to exert against the action of the spring 52 of each of them a release force that causes each member 42 to slide toward the release position.

Alternatively, the drive system 48 is a mechanical device, such as that shown FIGS. 10 to 15 or FIGS. 19 and 20, which is adapted to be actuated manually by an operator, for example via a lever.

When the release position is reached (FIG. 6), the actuator member 42 is locked in the release position in a third substep (a3).

Of course, this kind of substep (a3) is executed only in the presence of a locking system 62.

Generally speaking, the substep (a3) therefore consists in actuating the locking of at least one actuator member of the fixing means occupying a release position to retain said actuator member in the release position.

The drive system 48 is able to maintain each actuator member 42 in the release position at least until the locking substep (a3).

To effect locking, the actuator ceases to exert its force on the drive arms 82.

The effect of ceasing to apply forces to the drive arms 82 is that each locking latch 72 of each system 62 is automatically returned toward its locked position and, because the drive member 42 slides towards the release position, is engaged in the second detent 66 facing it, as shown in FIG. 9.

The locking latch 72 bearing against the lower bearing face 66i, the actuator member 42 in the release position is then locked by the locking latch 72 (locked position).

Automatic return of the latch 72 toward the locked position has the advantage of facilitating this maneuver because locking is obtained simply by releasing the drive arm 82 and without any additional force being necessary.

In a fourth substep (a4) the means for unsticking the shell 20 from the shell-carrier 22 are actuated.

Generally speaking, the substep (a4) is executed after releasing each half-mold and consists in actuating the unsticking means to cause the unsticking of each half-mold from the mold-carrier.

The fourth substep (a4) is advantageously carried out simultaneously with the execution of the substep (a2) by the actuator to load each actuator member 42 with a release force adapted to cause each of them to perform the overtravel beyond the release position in order simultaneously to bring about unsticking.

As shown in FIG. 10 by the elimination of the bold line, after the step (a), the shell 20 present inside the molding device 10 are no longer fixed to the shell-carriers 22, nor the mold bottoms 34 to the saddle, where applicable, with the result that the joined shells 20 grip between them the mold bottom 34 advantageously constituting a unitary subassembly.

However, the shells 20 are then held together only by the mold-carriers 14 that in the closed position surround said unitary subassembly.

This is why the mold 12 advantageously includes at least one part 120 that projects out of the molding device 10.

The shells 20 of the mold 12 advantageously have a projecting top part 120 extending vertically above the groove 32 in which the edge 38 of the shell-carrier 22 is received.

By way of nonlimiting example, the mold 12 shown in FIGS. 2 and 3 advantageously has such a projecting top part 120 adapted to enable holding and immobilization of the parts of the unitary subassembly.

The projecting top part 120 of the shells 20 is intended to allow fitting of assembly means, optionally able to provide a support function, to join the half-molds together and form said transportable unitary subassembly that is constituted by the shells 20 trapping the mold bottom 34.

Thanks to this top part, it is notably possible to join the shells 20 together from outside the molding device 10 when the mold-carriers 14 are in the closed position.

Accordingly, the second step (b) of the method of the invention consists in assembly means joining the half-molds together in such a manner as to form a transportable unitary subassembly when the mold-carriers occupy the closed position.

Each shell 20 being free of the shell-carrier 22 since execution of the step (a), there is a risk of the latter falling out when the mold-carriers 14 are opened.

In a particularly simple and economic embodiment, the assembly means are constituted by a link that is placed by the operator at the level of the top part 120 of the mold 12 that projects out of the mold-carrier 14 in such a manner as to immobilize the shells 20 in said joined position and constitute the unitary subassembly.

The assembly means are adapted to hold the half-molds together in order to constitute said transportable unitary subassembly forming a compact block that may be moved.

When the mold 12 includes a mold bottom 34, the latter is held automatically in place by cooperation of shapes with the shells 20 which, surrounding it, grip it circumferentially.

Numerous devices for holding and/or supporting the unitary subassembly may be envisaged, notably mechanical devices.

Alternatively, the mold 12 includes a temporary locking device adapted to hold the shells together to constitute the unitary subassembly. The locking device advantageously includes locking means that are mounted to be mobile between a retracted position and a locking position.

Moreover, the locking means are advantageously driven between said positions by a drive element, for example an element connected to the actuator member 42 of the fixing means 40 in such a manner as to exploit the sliding of said member 42 toward its release position to proceed immediately afterward to the immobilization of the shells 20.

The shells 20 are for example locked using the pegs 54 present on each of the shells 20.

In another variant holding means such as a clamp are placed around the top part 120 and provide both the function of assembling the shells together to form said unitary subassembly and the function of supporting such a unitary subassembly, said holding means being actuated by the operator or automated and connected to a support structure.

The step (b) is advantageously executable either before or after the step (a).

Whatever assembly means are chosen, they preferably also provide the support function in such a manner as to facilitate transporting the unitary subassembly.

The joining of the shells to form said unitary subassembly is represented in FIG. 10 by a bold line extending in the joint plane.

The third step (c) consists in opening the mold-carriers from the closed position to the open position to remove said unitary subassembly therefrom by a movement in translation in such a manner that said unitary subassembly remains in a reference position when the mold-carriers 14 are opened.

On opening the mold-carriers from the closed position to the open position, the unitary subassembly previously constituted is preferably removed "automatically" and remains stationary, only the mold-carriers 14 moving transversely away from each other.

When assembly only means (i.e. with no support function) are placed in the step (b), the unitary subassembly is supported by its bottom 34 in the reference position, notably by means of a saddle.

The assembly means are advantageously constituted by the holding means (not shown) referred to above, namely a clamp the jaws of which are adapted to grip the top part 120 of the unitary subassembly, which clamp then also provides the function of supporting the transportable unitary subassembly.

Thanks to the cooperation of the holding means associated with the top part 120, it is then possible to open the mold-carriers 14 of the molding device 10 without risk of the unitary subassembly falling out.

As illustrated in FIG. 10 by an arrow, the fourth step (d) consists in removing the unitary subassembly from its reference position between the mold-carriers.

The mold bottom 34 is preferably unlocked from the support saddle and the fluid connections unplugged before removing the unitary subassembly.

As indicated above, the unitary subassembly is advantageously entirely supported by the holding means from which the subassembly is suspended.

Of course, the holding means could equally be the hands of an operator holding the unitary subassembly produced by the assembly means to remove it from the reference position, which here is a central position.

Alternatively, removal of the unitary subassembly is automated and effected by means of a robot including at least one drive arm provided with holding means.

This completes the phase of the method of demounting the mold 12 with the molding device in the open position awaiting the mounting of another unitary subassembly.

As may be seen in FIG. 10, the absence of a unitary subassembly is symbolized by a dashed line.

As shown in FIG. 11, a phase of mounting a unitary subassembly then follows on from the aforementioned demounting phase. The following steps are executed for this purpose.

In the mounting phase, a fifth step (e) consists in placing a unitary subassembly in said reference position between the mold-carriers in the open position.

The mold-carriers 14 being in the open position, a unitary subassembly is introduced in the direction of the arrow into the reference position.

As shown in FIG. 11, a unitary subassembly (symbolized by the presence of the bold line in the joint plane) is introduced in the direction of said arrow between the mold-carriers 14 in the open position until the reference position is reached.

In this embodiment of the molding device 10, the bottom 34 is preferably mounted on the saddle and the required fluid connections, if any, are plugged in.

The unitary subassembly is then supported by the saddle and the shells 20 held by the assembly or holding means.

The mold-carriers are then closed onto the unitary subassembly in a sixth step (f).

As soon as the mold-carriers 14 close onto the unitary subassembly previously placed in the reference position, it is possible to remove the assembly means.

The seventh step (g) consists in removing the assembly means from the unitary subassembly to allow separation of the half-molds.

This is shown in FIG. 11 by the elimination of the lateral arrows and the elimination of the bold line between the two half-molds which no longer form said transportable unitary subassembly.

The eighth step (h) consists in actuating the fixing means to fix each half-mold to the associated mold-carrier.

With fixing means 40 conforming to the first embodiment, fixing is obtained by executing substeps similar to those described above for step (a) of the demounting phase.

The locking system 62 is unlocked in a substep (h1).

The fixing of the shells 20 in the shell-carriers 22 is advantageously obtained automatically because the actuator members 42 are returned toward the fixing position and so no specific fixing substep is required.

In the absence of an actuator member 42 return spring, in a substep (h2) the drive system 48 is actuated to move the actuator member from the release position toward the fixing position, for example by means of the actuator forming the drive system 48.

Once the fixing position has been reached (FIG. 5), the locking system 62 is actuated to lock said actuator member 42 for the fixing means 40 in the fixing position.

As the locking system 62 includes a spring for returning the latch 72 to the locking position from the position of fixing the actuator members 42 of the fixing means 40, no particular substep is required and locking is obtained automatically.

Alternatively, in the absence of any such means for returning the latch 72 toward the locked position, the locking system 62 is actuated in a substep (h3) to lock the actuator member by means of the latch 72.

If necessary, the lock 18 is then advantageously actuated to lock the mold-carriers 14 in the closed position.

The mold changing method of the invention has the advantage of enabling a great reduction in the time necessary for demounting and mounting compared to known solutions of the prior art.

The unitary subassembly formed by the shells 20 and where applicable the mold bottom 34 may be mounted and demounted in a single operation rather than successive operations of grasping and then putting down each of the parts.

Such a mold changing method is made possible by the fixing means of the invention that enable release and fixing of the unitary subassembly in a particularly simple and fast manner.

In a particularly advantageous operating procedure, intervention of the operator is reduced or even eliminated and the support means, such as a clamp actuated to open and close it and advantageously also providing the function of holding the unitary subassembly, are connected to a transport device.

Such a transport device is advantageously adapted to transport the unitary subassembly after the demounting phase to a store while other support means are advantageously waiting with a new unitary subassembly to mount it immediately on the molding device 10 by the steps corresponding to the mounting phase.

Of course, in the method just described, to be able to open and close the molding device 10, the lock 18 for the closed mold-carriers 14 is actuated beforehand or simultaneously to move toward its unlocked or locked position in order to be able to move the mold-carriers 14 away from each other, this unlocking and opening being effected manually by the operator.

To this end, after manually exerting a force on the cam driving the lock 18, the operator exerts a transverse force, again manually, to move the mold-carriers 14 apart and to open them until they reach said open position.

The lock 18 preferably includes return means adapted to return the lock automatically to its position for locking the mold-carriers in the closed position.

The second mold changing method thus advantageously enables further reduction of the time necessary for demounting compared to the first method, even more so compared to the solutions known in the prior art.

In the second method, the unitary subassembly formed of the shells 20 and where applicable the mold bottom 34 may be mounted or demounted in a single operation and no longer by successive operations for each shell 20.

Such a mold changing method is made possible by the fixing means of the invention thanks to which the unitary subassembly is released in a particularly simple and fast manner.

In a particularly advantageous operating procedure, intervention of the operator is reduced or even eliminated and the means for holding the unitary subassembly, such as a clamp actuated to open and close it, are connected to a transport device adapted to transport such a unitary subassembly after the demounting phase to a store while other holding means are advantageously waiting with the new molding unitary subassembly to mount it immediately on the molding device 10 by the steps corresponding to the mounting phase.

Of course, the embodiment of the fixing device for a molding device described above and shown in FIGS. 1 to 9 merely constitutes one embodiment of a fixing device suitable for use in the method of the invention of changing a mold.

French patent application No. 09.56074 in the name of the applicant, filed 07.09.2009, describes and shows another fixing device for a molding device including fixing means suitable for use in the method of the invention of changing a mold.

There is briefly described next, by way of a variant embodiment, a fixing device of that kind (not shown) also suitable for use in the method of the invention of changing a mold, more details of which may be obtained by referring to the aforementioned French patent application.

According to the invention, the fixing means of said fixing device for fixing each half-mold to the mold-carrier are characterized in that they are adapted to be actuated selectively to fix or release each half-mold when the mold-carriers are in the closed position.

To be more precise, the fixing means are adapted selectively to exert an attraction force on each half-mold to fix it to the associated mold-carrier.

The fixing means exerting said attraction force are advantageously suction means adapted to fix the half-molds by a sucker effect.

To this end, the fixing means include at least one airtight chamber reserved at the interface between the mold-carrier and the half-mold, that is associated with suction means including at least one selectively operable vacuum source.

The airtight chamber advantageously communicates with said selectively operable vacuum source via an aspiration pipe to establish in the airtight chamber a pressure lower than atmospheric pressure.

The airtight chamber is adapted to be subjected to a so-called fixing pressure that is less than atmospheric pressure in order to hold the half-mold pressed onto the bottom of the recess of the mold-carrier by a sucker effect.

When the half-mold is in the mounted position, its external face comes into contact with the bottom of the recess, thus transversely closing the cavity to form the airtight chamber.

The cavity is advantageously shallow in order for the airtight chamber to have a small volume. The intensity of the aspiration or attraction force exerted by the vacuum is proportional to the area delimited by the contour of the airtight chamber.

The airtight chamber is sealed by a continuous seal that externally surrounds the contour of the cavity 46 and has a parallelepiped shape, for example.

The seal is preferably carried by the mold-carrier and is received in an annular groove that is produced in the bottom of the recess of the mold-carrier. The seal is adapted to be compressed between the external face of the half-mold and the bottom of the recess to seal the airtight chamber.

The airtight chamber advantageously communicates with a selectively operable vacuum source via an aspiration pipe to enable the pressure in the airtight chamber to be reduced to a pressure lower than atmospheric pressure.

The vacuum source is adapted to be commanded selectively between an activated state in which the fixing means are active and a deactivated state in which the fixing means are inactive.

Compared to the previous embodiment, the activated state corresponds to the fixing position and the deactivated state corresponds to the release position.

The aspiration pipe is preferably produced within the thickness of the mold-carrier and extends from an orifice for connection to the source at the bottom of the mold-carrier as far as an orifice that opens into the airtight chamber.

The connecting orifice includes connection means intended to be connected with the vacuum source 52 via a flexible hose.

The flexible hose enables the vacuum source to be installed on a support fixed relative to the carousel, for example the bracket, whereas the mold-carrier is mobile.

The vacuum source is formed for example by a Venturi effect pump such as a pump including a Venturi tube having a smaller section in the middle. A flow of compressed air passes through the Venturi tube and creates a reduced pressure in the reduced section.

The aspiration pipe is connected to the Venturi tube at the level of the reduction in size to enable aspiration of air contained in the airtight chamber.

There will be described now the method of changing the mold of a molding device equipped with a fixing device of the second embodiment that has just been described.

To carry out the mounting phase, the method includes at least a first step (a) consisting in actuating the fixing means to release each half-mold when the mold-carriers occupy the closed position.

To demount the half-molds, the airtight chamber is returned to atmospheric pressure, for example by deactivating the vacuum source and opening the control valve.

The vacuum source is then commanded from its activated state in which the fixings are active to a deactivated state in which the fixing means are inactive and each half-mold released.

For reasons analogous to those given above for the first embodiment, there then follows in the second step (b) consisting in joining the half-mold together by means of assembly means in such a manner as to form a transportable unitary subassembly when the mold-carriers occupy the closed position.

The immobilizing means are preferably constituted by a connection disposed around the top part or alternatively by a clamp, before the mold-carriers are open.

Support means are advantageously provided to support the transport of a unitary subassembly, falls back to the assembly means, to prevent a subassembly falling out when the mold-carriers are open.

The assembly function and the function of supporting the transportable unitary subassembly are preferably provided by the same means, such as the clamp for holding the unitary subassembly by the top part projecting out of the molding device when the mold-carriers are in the closed position.

There then follows a third step (c) consisting in opening the mold-carriers from the closed position to the open position to extract said unitary subassembly therefrom by a movement in translation and in such a manner that said unitary subassembly remains in a reference position.

When the subassembly is no longer connected to the molding device, for example via the mold bottom which will be fastened to the saddle, a fourth step (d) consists in removing the unitary subassembly from between the mold-carriers starting from its reference position.

The operation of the vacuum source may advantageously be reversed in order to enable the pressure in the airtight chamber to be increased to a pressure above atmospheric pressure.

It has been found that if the half-mold has remained for several hours pressed against the bottom of the recess, the half-mold frequently adheres to the mold-carrier. This adhesion is liable to slow down the operation of demounting the half-mold.

To reverse the operation of the Venturi effect pump, it is for example possible to flow directly into the aspiration pipe the compressed air that normally feeds the Venturi tube, notably by means of a three-port valve.

Reversing the operation of the vacuum pump enables an increased pressure to be created in the airtight chamber that causes the half-molds to become unstuck.

Such an unsticking step is advantageously executed after releasing the half-molds and before the opening step (c).

At the end of the demounting phase, there follows the phase of mounting a new transport unitary subassembly by executing at least the following steps:
(e) placing a unitary subassembly in said reference position between the mold-carriers in the open position,
(f) closing the mold-carriers onto the unitary subassembly,
(g) removing the assembly means from the transportable unitary subassembly to allow separation of the half-molds,
(h) actuating the fixing means to fix each half-mold to the associated mold-carrier.

In the reference position, and after closing the mold-carriers onto the unitary subassembly, the external face of the half-mold cooperates with the bottom of the recess to close the cavity in order to form the airtight chamber. The seal of the recess is compressed by the half-mold to seal the airtight chamber.

The Venturi effect from pump is then activated. The Venturi effect pump then aspirates the air present in the airtight chamber, thereby causing a socket effect enabling the external face of the half-mold to be pressed against the bottom of the recess.

This compresses the seal even more and thus improves the sealing of the airtight chamber.

The dimensions of the airtight chamber and the pressure in the airtight chamber when the Venturi effect pump is operating are designed so that the force of the fraction exerted by the vacuum in the airtight chamber is sufficient to maintain the half-mold fixed when the blow-molding device is operating, including during fast and repetitive opening and closing of the mold-carriers to reject the blow-molded containers.

The Venturi effect pump advantageously includes means for measuring the pressure in the airtight chamber and a control valve for closing the fraction pipe in a sealed manner. The control valve is disposed between the pressure measuring means.

The fixing device preferably includes an electronic control unit enabling control of the closing of the control valve and supply of compressed air through the Venturi tube.

The pressure measuring means are able to communicate the measure pressure through the electronic control unit.

If the measured pressure is less than or equal to the fixing pressure, the electronic control unit commands closure of the control valve and cuts off the supply of compressed air to the Venturi tube.

Thus the airtight chamber is maintained at its fixing pressure with no external source of energy. The pressure in the airtight chamber may nevertheless vary, for example because of slight air leaks.

If the pressure in the airtight chamber is measured as being greater than a particular threshold value relative to a pressure limit value beyond which fixing may be improved, the electronic unit then commands reactivation of the supply of compressed air to the Venturi tube and opening of the control valve, in order to aspirate the air contained in the airtight chamber.

In another embodiment of the invention, the half-mold is fixed to the mold-carrier by magnetic attraction.

In the mold changing method described above and shown in FIGS. 10 and 11, the reference position is a central position between the mold-carriers, the half-mold being released, simultaneously or not, before the step of opening the mold-carrier.

Alternatively, the reference position is a lateral position and the fixing means commanded successively.

For removal from mold-carriers occupy the closed position, the method then consists in fitting assembly means (if they are not incorporated) in order to constitute the unitary subassembly, to release the mold working from the saddle, to open only one of the half-molds, to open the mold-carrier.

The unitary subassembly is then supported by the mold-carrier the fixing means thereof have not been actuated towards the release position.

To remove the unitary subassembly that then occupies a lateral reference position, the fixing means are actuated to release the half-mold of the subassembly (which is still fixed, preferably with the assistance of unsticking means, and the subassembly is then removed).

The subassembly is removed manually by an operator, for example, either directly by hand or with the assistance of holding means such as a clamp adapted to support the subassembly during its release (or even also the assembly of the half-molds forming said subassembly in the absence of assembly means fitted before release).

Of course, the unitary subassembly may also be removed automatically, without the intervention of an operator, notably by means of a manipulator robot having the end of an articulated arm holding means adapted to grasp the subassembly and then to transport it, once it has been released.

The invention claimed is:

1. A method of changing a mold of a molding device (10) for the manufacture of thermoplastic material containers, said method comprising:
using the molding device (10) for the manufacture of thermoplastic material containers, by forming a preheated preform, the molding device (10) including i) two half-mold carriers (14) mounted to be mobile relative to each other about a common rotation axis (O) between an open position and a closed position and ii) two half-molds (20) each demountably fixed to an associated half-mold carrier (14) by fixing means (40), the half-mold carriers (14) being opened and closed with a rotational movement around the common rotation axis (O), and
a mold demounting step comprising at least the steps of:
(a) when the half-mold carriers (14) occupy the closed position, actuating the fixing means to release each half-mold (20),
(b) when the half-mold carriers (14) occupy the closed position, using assembly means for joining the half-molds (20) together in such a manner as to form a transportable unitary subassembly,
(c) opening the half-mold carriers (14) from the closed position to the open position, by the half-mold carriers (14) being opened with the rotational movement around the common rotation axis (O), to allow removal of said unitary subassembly therefrom by a movement in translation and in such a manner that said unitary subassembly remains supported in a reference position until removed, and (d) removing the unitary subassembly, using a translation movement, from between the half-mold carriers (14) from the reference position.

2. The method according to claim 1, further comprising, for executing the step (a), at least one substep (a1) of actuating the unlocking of at least one actuator member of the fixing means occupying a fixing position to release said actuator member.

3. The method according to claim 1, further comprising, for executing the step (a), at least one substep (a2) of actuating a drive system to slide an actuator member of the fixing means from a fixing position to a release position.

4. The method according to claim 1, further comprising, for executing the step (a), at least one substep (a3) of actuating the locking of at least one actuator member of the fixing means occupying a release position to retain said actuator member in the release position.

5. The method according to claim 1, further comprising, for executing the step (a), at least one substep (a4), executed after the release of each half-mold, of actuating unsticking means to cause the unsticking of each half-mold from the associated half-mold carrier (14).

6. The method according to claim 1, further comprising, at least the following steps for mounting another mold:

(e) placing a new molding unitary subassembly in said reference position between the half-mold carriers (14) in the open position, (f) closing the half-mold carriers (14) onto the unitary subassembly, (g) removing the assembly means from the unitary subassembly to allow the separation of the half-molds (20), and (h) actuating the fixing means to fix each half-mold (20) to the associated half-mold carrier (14).

7. The method according to claim 6, further comprising a supplementary step executed before the step (c) and after the step (e) of:

actuating support means adapted to retain said unitary subassembly in the reference position.

8. The method according to claim 6, further comprising, for executing the step (h), at least one substep (h1) of actuating the unlocking of at least one actuator member of the fixing means occupying the release position to release said actuator member.

9. The method according to claim 8, further comprising, for executing the step (h), at least one substep (h3) of actuating the locking of at least one actuator member of the fixing means occupying a fixing position to retain said actuator member in the fixing position.

10. The method according to claim 6, further comprising, for executing the step (h), at least one substep (h2) of actuating a drive system to drive sliding of an actuator member of the fixing means from a fixing position to a release position.

11. The method of claim 1, wherein the fixing means (40) fixes each half-mold (20) to the associated half-mold carrier (14) and are adapted to be actuated selectively to fix or to release each half-mold (20) when the half-mold carriers (14) are in the closed position and to allow introduction or removal of the unitary subassembly by the movement in translation.

12. The method according to claim 11, wherein the fixing means (40) includes at least one actuator member (42) of the fixing means (40) that is adapted to be driven in movement between at least a fixing position and a release position from outside the molding device (10) when the half-mold carriers (14) are in the closed position.

13. The method according to claim 12, wherein the actuator member (42) of the fixing means (40) is driven in translation in such a manner as to slide between said fixing and release positions.

14. The method according to claim 11, wherein the selectively actuated fixing means (40) are adapted to exert a force of attraction on each half-mold to fix fixing means to the associated half-mold carrier (14).

15. The method according to claim 14, wherein the fixing means (40) exerting said force of attraction are suction means adapted to fix the half-molds by a sucker effect.

16. The method according to claim 1 wherein said step of removing the unitary subassembly uses a robot including at least one arm provided with holding means that grasps and transports said unitary subassembly from the reference position.

17. The method according to claim 16, wherein the holding means of the robot constitute said assembly means, said both said joining step and said removing step are automatically performed by the holding means of the robot.

18. The method according to claim 16, wherein the molding device includes a part (120) of the mold that projects out of the molding device (10), and the holding means cooperates with the part (120) of the mold that projects out of the molding device (10).

19. The method according to claim 18, wherein the holding means are constituted by a clamp including jaws adapted to grasp said part (120) of the mold, and in said joining step, the holding means cooperates with said part (120) of the mold to hold and immobilize the parts of the unitary subassembly.

20. The method according to claim 18, wherein the holding means are constituted by a clamp actuated to open and close the holding means, the clamp being placed around said part (120) of the mold in both the joining step of forming the unitary subassembly and in the opening step of supporting the unitary subassembly in the reference position.

21. The method according to claim 16, the step (d) is executed automatically by the robot removing the unitary subassembly from between the half-mold carriers (14) from reference position and a further step (e) of placing a new molding unitary subassembly in said reference position between the half-mold carriers (14) in the open position.

22. The method according to claim 6, comprising using further holding means waiting with the new molding unitary subassembly to carry out, immediately after a demounting phase comprising the steps (a) to (d), mounting of said new molding unitary subassembly on the molding device (10) by the steps (e) to (h) corresponding to the mounting of said new molding unitary subassembly on the molding device (10).

* * * * *